Feb. 18, 1947.  A. L. JOHNSON ET AL  2,415,885
HYDRAULIC TRANSMISSION CONTROL
Filed May 13, 1943   9 Sheets-Sheet 3

INVENTOR
Albert L. Johnson
BY Selmer A. Kraft
Robert M. Dunning
ATTORNEY

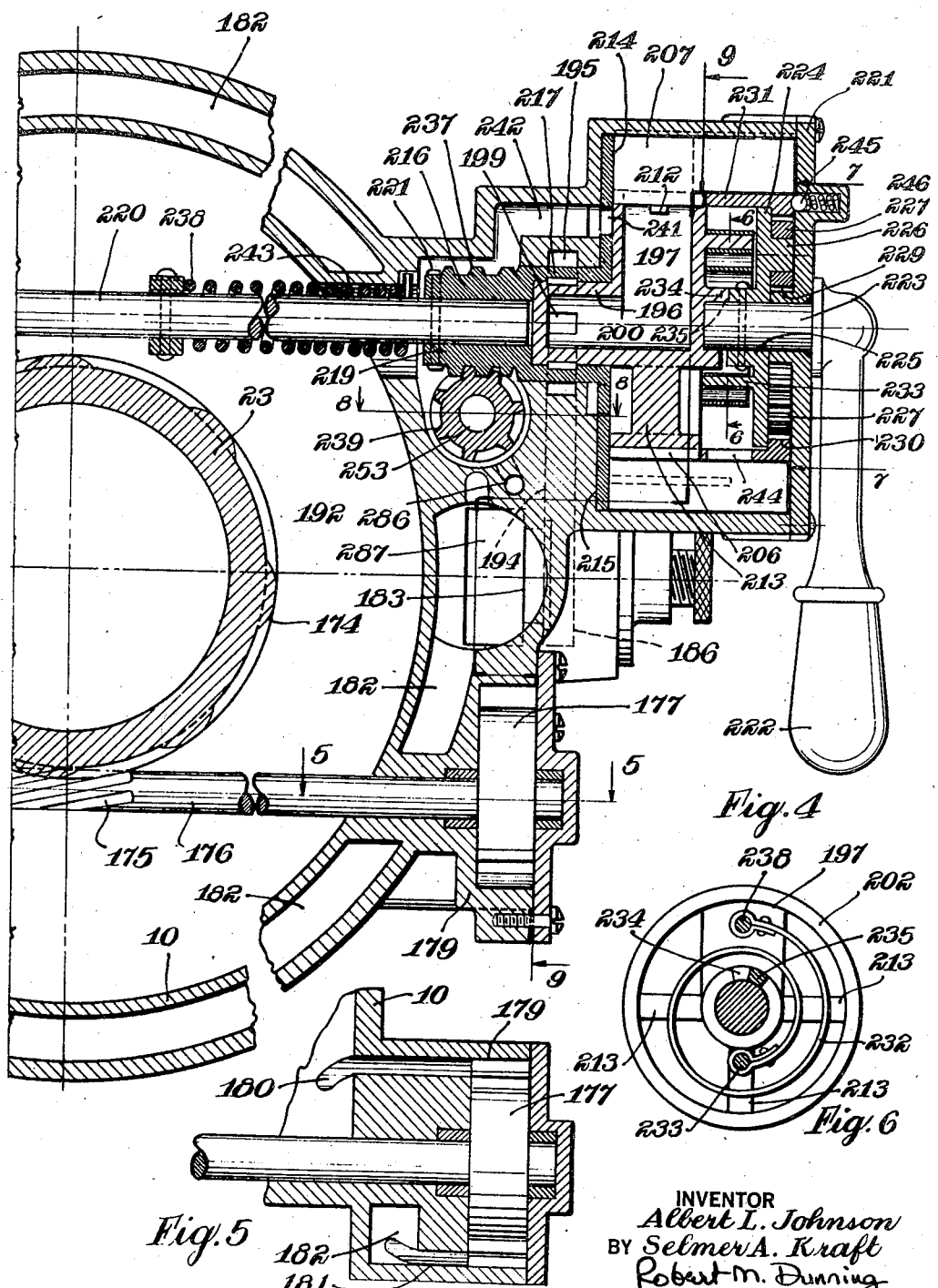

Feb. 18, 1947.  A. L. JOHNSON ET AL  2,415,885

HYDRAULIC TRANSMISSION CONTROL

Filed May 13, 1943  9 Sheets-Sheet 5

INVENTOR
Albert L. Johnson
BY Selmer A. Kraft
Robert M. Dunning
ATTORNEY

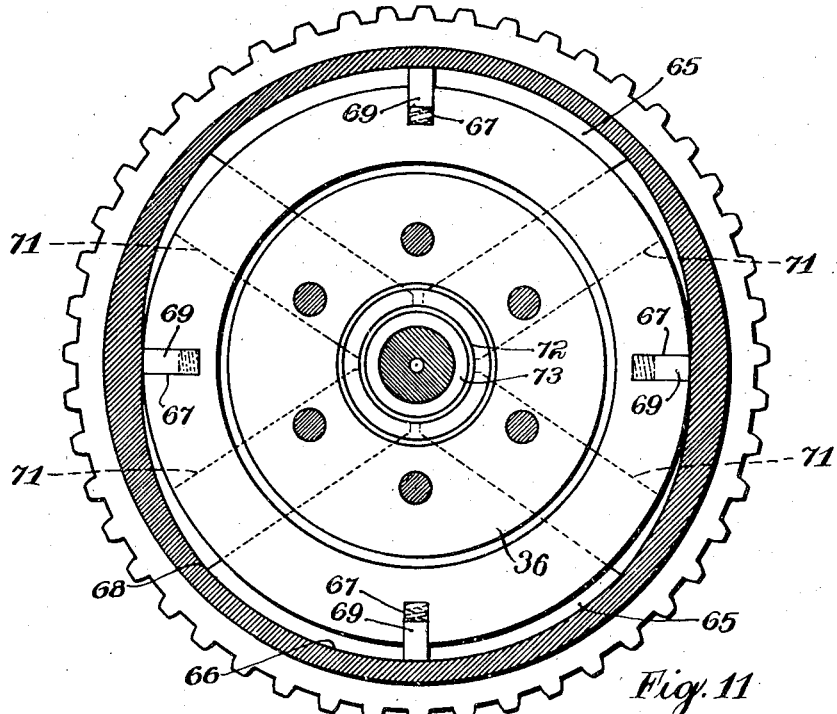
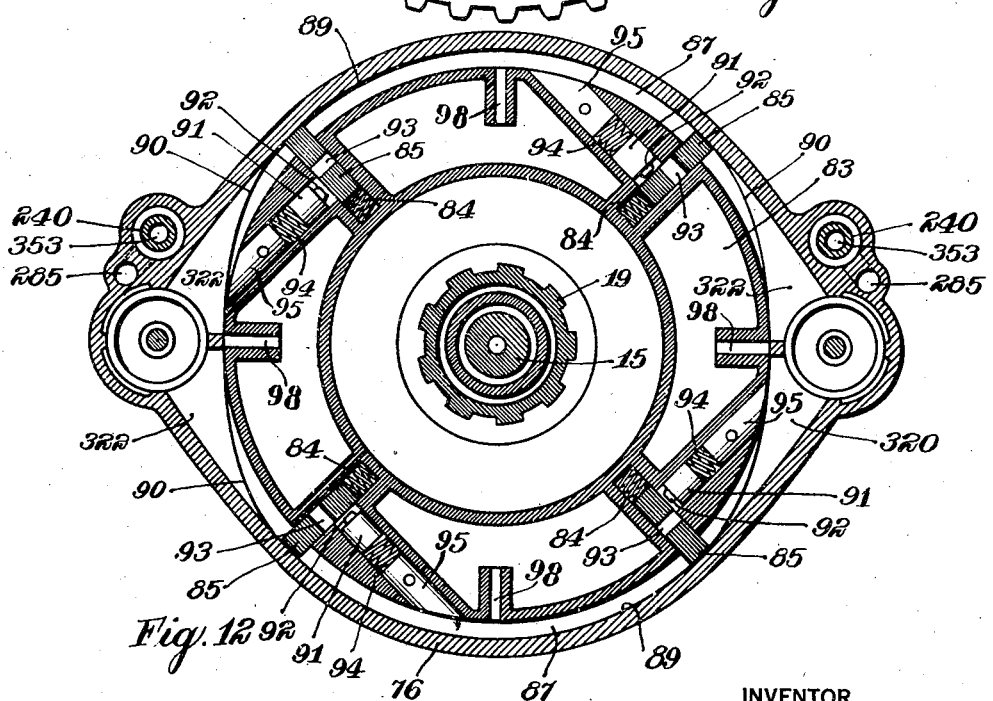

Feb. 18, 1947.   A. L. JOHNSON ET AL   2,415,885
HYDRAULIC TRANSMISSION CONTROL
Filed May 13, 1943   9 Sheets-Sheet 7

INVENTOR
Albert L. Johnson
BY Selmer A. Kraft
Robert M. Dunning
ATTORNEY

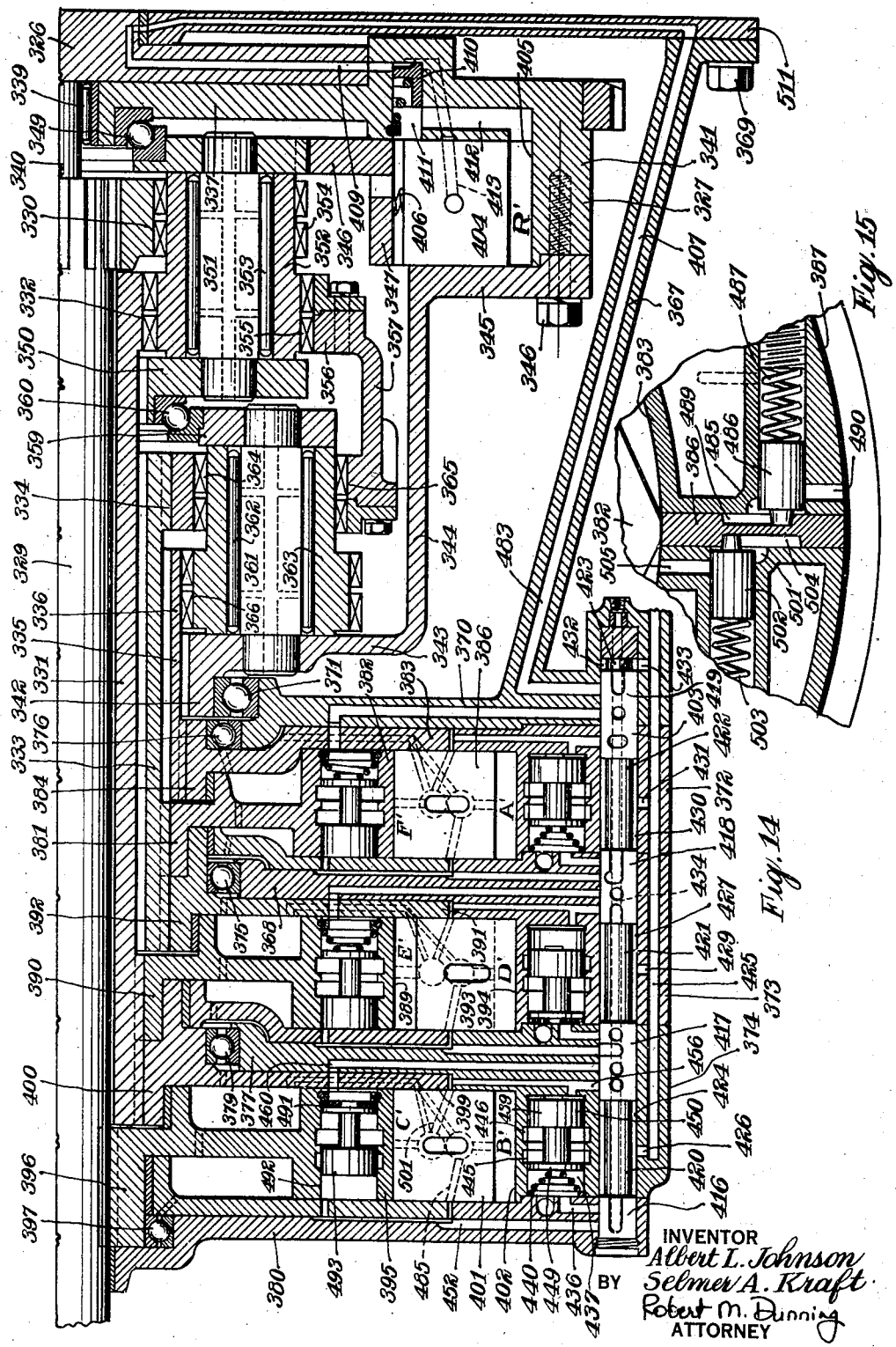

Feb. 18, 1947.  A. L. JOHNSON ET AL  2,415,885
HYDRAULIC TRANSMISSION CONTROL
Filed May 13, 1943  9 Sheets-Sheet 9

INVENTOR
Albert L. Johnson
BY Selmer A. Kraft
Robert M. Dunning
ATTORNEY

Patented Feb. 18, 1947

2,415,885

UNITED STATES PATENT OFFICE 2,415,885

HYDRAULIC TRANSMISSION CONTROL

Albert L. Johnson and Selmer A. Kraft, St. Paul, Minn., assignors to Johnson Power-On Transmission Corporation, St. Paul, Minn., a corporation of Minnesota Application May 13, 1943, Serial No. 486,809

7 Claims. (Cl. 74—276)

1

Our invention relates to an improvement in hydraulic transmission control, wherein it is desired to provide an apparatus capable of controlling the operation of a transmission or the like.

In a co-pending application filed in the name of Albert L. Johnson, Serial No. 384,792, a planetary type transmission was described embodying friction type clutches to hold various elements of the transmission from relative rotation. While this previously described transmission was entirely successful in its operation, certain advantages were felt to exist in a hydraulic clutch arrangement capable of taking the place of the friction clutches.

It is the object of the present invention to provide a hydraulic control for a transmission or the like capable of holding various elements of the transmission from relative rotation. In some instances it is desired to hold two rotatable elements together to cause rotation of these elements in unison. In other instances it is desired to hold certain rotative parts stationary. Our hydraulic clutch mechanism is capable of accomplishing these results in a simple and effective manner.

A feature of the present invention lies in the provision of a clutch embodying a fixed casing, a rotative member rotatably supported in said casing, and a second relatively rotatable element independently rotatable within the first named rotatable element. Means are provided for locking the two relatively rotatable members together for operation in unison and means are also provided for locking one of the rotatable members in stationary position. This double action of the clutch device renders the same capable of accomplishing a multiplicity of different results.

A feature of the present invention lies in the provision of a clutch device comprising a rotatable element within a casing and in providing vane means in the rotatable element engageable with the casing. The rotatable element is held stationary when so desired by projection of the vanes into engagement with a cam-shaped pocket in the casing. When preferred, however, the vanes may be retracted into the rotatable member to rotate therewith without creating undue friction or back pressure, and without the necessity of circulating oil.

A further feature of the present invention lies in the provision of an inner rotatable member positioned within an outer rotatable element and in the provision of a cam-shaped outer surface on the inner rotatable member which is engage-

2 able with the vane means on the outer rotatable member. As a result when the vane means project inwardly from the outer rotatable member they may act to prevent relative rotation between the two relatively rotatable elements. However, when the vane means are in outwardly projecting position the same vane means may act to hold the outer rotatable member stationary in its casing.

A further feature of the present invention lies in the provision of locking means capable of holding the vane means in intermediate position retracted into the outer rotatable element. Thus the two rotatable members may rotate relative to each other and relative to the casing without undue friction or circulation of hydraulic liquid.

A further feature of the present invention lies in the provision of an automatic control capable of actuating the vane means carried by the outer rotatable member. This control is operable in response to the volume of liquid pumped by a suitable liquid pump connected to the drive shaft of the power unit driving the transmission. Thus as the speed of the driving unit increases the volume of liquid pumped will increase, operating through the control to change the gear ratio between the driving and the driven shaft.

A feature of the present invention lies in the fact that our control operates in response to torque exerted upon the driven element. If the torque load on the driven element suddenly increases there is an instant tendency for the driven element to decrease in speed, which in turn reduces the volume of liquid pumped to the control. The speed ratio may be changed under various conditions. First, the ratio may change by varying the speed of the driving motor. Second, upon acceleration of the motor the speed ratio may vary. Third, the idling adjustment, or dash adjustment has a bearing on the speed ratio and the time required to change from one speed ratio to the next. In the fourth place, the control may be set to limit change of speed ratio. In the fifth place, manual operation of the control may take place when desired. Finally, when so desired, the automatic control may function to vary the speed ratio through an entire range of speeds from a low speed to a high speed ratio with a single operation of the manual control.

An additional feature of the present invention lies in the provision of a clutch in the form of a vane pump, in which a rotor supporting slidable vanes is mounted for cooperation with a cam-shaped surface. Means are provided whereby pressure on opposite sides of each vane is equalized during the sliding movement of the vane, or during projection or retraction of each vane.

These and other objects and novel features of our invention will be more clearly and fully set forth in the following specification and claims.

In the drawings forming a part of our specification:

Figure 4 is a vertical section taken substantially on the line 4—4 of Figure 1.

Figure 5 is a sectional view taken on substantially the line 5—5 of Figure 4.

Figure 6 is a section taken substantially on the line 6—6 of Figure 4.

Figure 11 is a sectional view through the transmission, the position of the section being indicated by the line 11—11 of Figure 3.

Figure 12 is a sectional view through a clutch unit, the position of the section being indicated by the line 12—12 of Figure 3.

Figure 14 is a sectional view partially through a modified form of transmission control.

Figure 15 is a cross-sectional view through the vane locking plunger mechanism.

Figure 1:
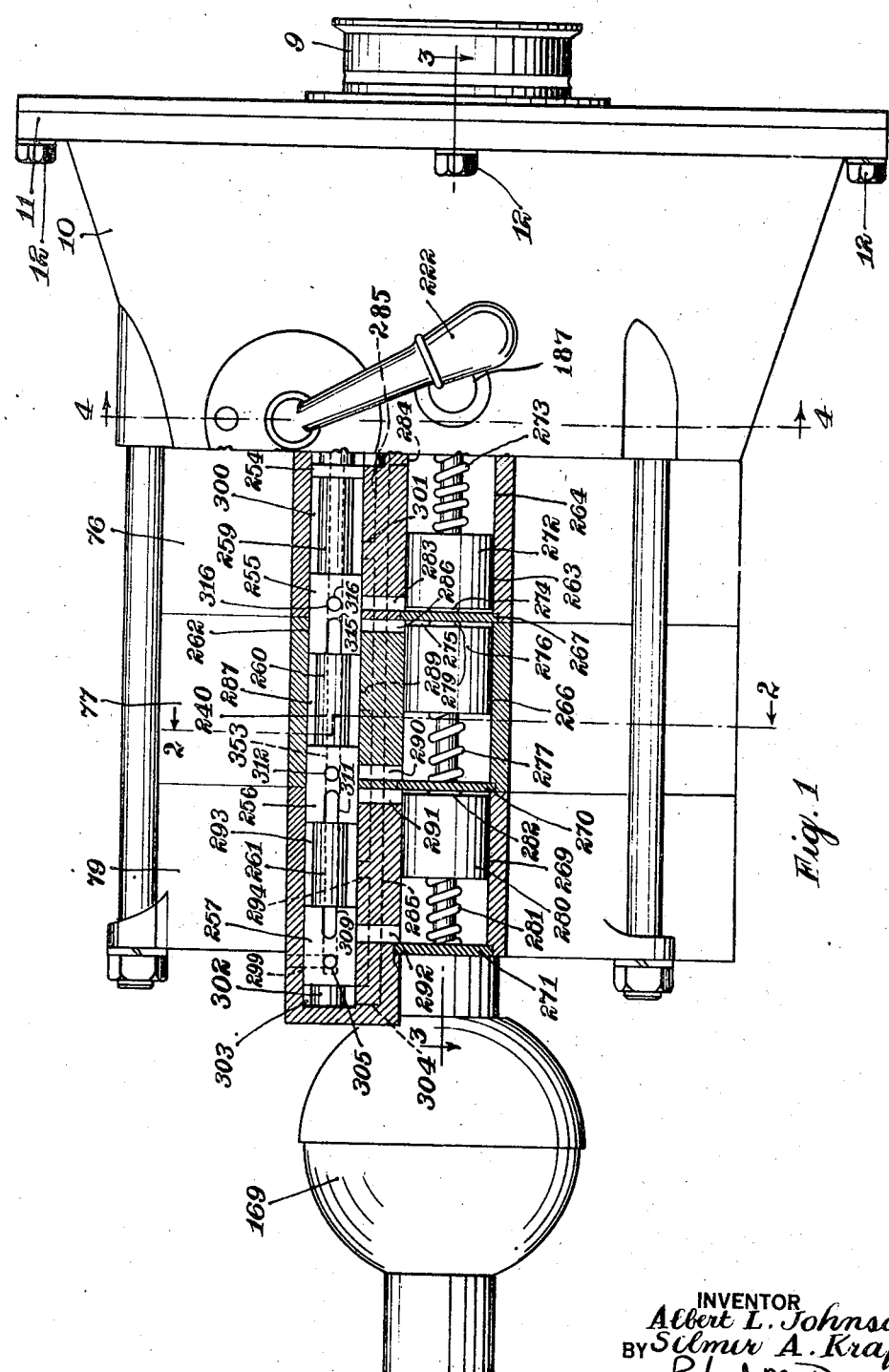
Figure 1 is a side elevational view, partly in section, showing our transmission and controlling unit therefor.
Figure 3:
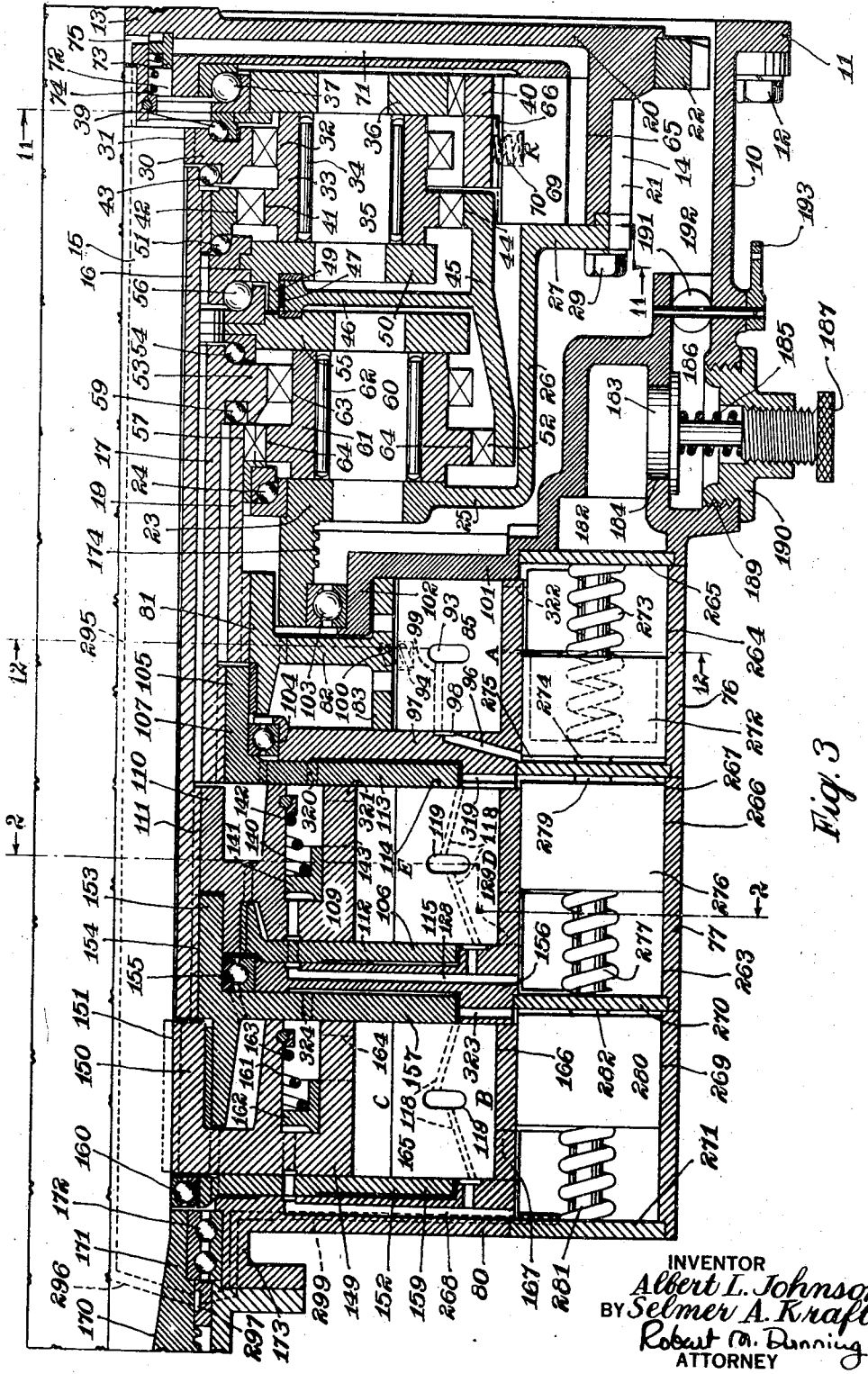
Figure 3 is a longitudinal section through one-half of the transmission on substantially the line 3—3 of Figures 1 and 2.

The transmission is best illustrated in Figures 1 and 3 of the drawings, Figure 1 illustrating the outer appearance thereof, while Figure 3 is a transverse section through slightly more than one-half of the same. The transmission gears are enclosed by an inner gear housing positioned within a tapered housing or enclosure 10 having an attachment flange 11 thereon, by means of which the housing may be secured to the drive unit which may comprise an internal combustion engine or the like. As viewed from the top, as in Figure 3, the cone-shaped portion 10 of the casing bulges outwardly to some extent because of the operating valves which are positioned on opposed sides of the transmission housing. The flange 11 is secured to the power unit by any suitable means such as cap screws 12.

The following description involves an epicyclic gear transmission system, a clutch system for controlling the rotation of various elements thereof, and a control system for hydraulically controlling the clutch system. For the purpose of clarity, these systems will be described in succession.

The transmission system

With reference now to Figure 3 of the drawings, the engine drive shaft, not illustrated in the drawings, is preferably equipped with an end flange 9, or similar attachment (see Figure 1), to which the hub flange 13 of the gear housing 14 is attached. Thus, upon rotation of the engine crank shaft, the gear housing 14 is rotated through the hub 13. The driven shaft 15 is preferably coaxial with the drive shaft connected to the hub 13 and coaxial with the gear housing 14. Sleeves 16, 17, and 19 encircle the driven shaft 15, extending various lengths longitudinally of the same, as will be later more fully described in detail. The sleeve 16 freely encircles the shaft 15 and may rotate with respect thereto. The sleeve 17 encloses a portion of the sleeve 16, while the sleeve 19 encloses a portion of the sleeve 17.

The gear housing 14 is formed of two portions, one of which includes a disk member 20 extending radially outwardly from the hub 13 and having a hollow cylindrical flange 21 projecting laterally therefrom near the outer extremity thereof. A ring gear 22 is secured to the outer periphery of the disk 20 so that the housing 14 may be rotated by a starting motor, when desired, for starting the engine. A second portion of the housing 14 includes a hub 23 supported by a bearing on the end wall of the housing 10 which will be later described, and supports a bearing 24 encircling the sleeve 19. A disk 25 extends outwardly from this hub 23 for supporting a cylindrical shell 26 of smaller diameter than the cylindrical flange 21. A ring-shaped flange 27 is provided on the extremity of the cylindrical shell 26 and this flange 27 is secured to the cylindrical flange 21 by cap screws 29 or other suitable means. Thus a gear housing is provided, one end of which is secured to the drive shaft for rotation therewith, and the other end of which is supported by the stationary housing 10. The disks 20 and 25 form the ends of the housing 14, while the connected cylindrical shells 21 and 26 form a gear enclosure.

A sun gear 30 is provided on the driven shaft 15, being splined thereto at 31 and being concentric with the drive shaft. The sun gear 30 is continuously meshed with the gear teeth 32 of the double pinion 33. In actual construction a plurality of such double pinions are supported in angularly spaced relation about the sun gear 30, as better illustrated in the above mentioned copending application. For the purpose of illustration, however, it is necessary to show but one of these double pinions in order to understand the operation of the present device. The double pinion 33 forms the planet gear means of one epicyclic gear system.

The double pinion 33 is supported by a bearing 34 encircling a stub shaft 35. The stub shaft 35 is supported at one end by a disk-shaped support 36, which in turn is supported by a bearing 37 encircling a portion of the hub 13 of the gear casing 14. A bearing 39 is provided between the disk-shaped support 36 and the sun gear 30 mounted on the driven shaft 15. Thus the support 36 is freely rotatable both with respect to the drive shaft and with respect to the driven shaft. The disk-shaped support 36 is peripherally keyed to a rotor 40 forming the rotative element of a clutch R. The construction of this clutch will be more fully described.

The teeth 41 of the double pinion 33 are meshed with a sun gear 42 rotatable with the sleeve 16. The sleeve 16 is supported rotatably upon the shaft 15 and a bearing 43 therebetween prevents excessive friction and wear between the shaft 15 and the sleeve 16 and between the sun gears 30 and 42, caused by end thrust of the sleeve 16 due to helical construction of the sun gears. The teeth 41 of the double pinion 33 also engage an internal ring gear 44 upon a rotatable sleeve 45. The sleeve 45 is supported by a central disk 46 mounted upon a bearing 47 engaging a cylindrical flange 49 on a disk 50. The disk 50 extends parallel to the disk 36 and in spaced relation thereto, and forms a bearing for one end of the stub shaft 35. However, intermediate angularly spaced double pinions 33, and in angular relation thereto, the disks 36 and 50 are bolted together to rotate in unison and to act as a single unitary support.

From the foregoing description it will be noted that we have provided a planetary or epicyclic gear system including sun gears 30 and 42, a double pinion 33 engaging both of these sun gears, and a ring gear 44 engaging the teeth 41 of the double pinion 33. The sun gears 30 and 42 are of different diameter, the sun gear 30 being of greater diameter than the sun gear 42, and the pinion formed by the teeth 32 being of smaller diameter than the pinion formed by teeth 41. The disks 36 and 50 supporting the stub shaft 35 form a planetary gear carrier for the planet gears 33 connecting the sun gears 30 and 42 to the ring gear 44. The ring gear, the sun gears 30 and 42, and the planetary gears 33 are all supported for relative rotation and likewise the planet gear carrier comprising disks 36 and 50 may revolve independently of these gears.

The disk 50 assists in supporting the sleeve 16 by means of a bearing 51 so that the planet gear carrier and the sleeve may rotate freely about their respective axes. The disk 46, supporting the sleeve 45 bearing the ring gear 44, could likewise be supported by some other element, but for the sake of convenience the bearing 49 is provided separating this disk 46 from a cylindrical flange 49 on the disk 50.

A second epicyclic gear system is likewise provided within the gear casing 14. This second gear system is connected to the first system through the ring gears of the respective systems, the sleeve 45 being provided with a second internal ring gear 52 at the extremity thereof opposite the internal ring gear 44. The two ring gears 44 and 52 are of different diameters, the gear 52 being shown larger in diameter than the gear 44.

A sun gear 53 is mounted upon the end of the sleeve 17 and is rotatably supported by a bearing 54 interposed between the sleeve 17 and the hub of the planet gear carrier disk 55. This planet gear carrier disk 55 in turn supports a bearing 56 between the disk 55 and the hub of the gear carrier disk 50. The bearing 54 absorbs end thrust of sleeve 17 due to helical formation of the teeth of the sun gear 53.

A second sun gear 57 is mounted upon the sleeve 19. A thrust bearing 59 is interposed between the end of the sleeve 19 and the sun gear 53 to hold these elements in proper relation and to absorb end thrust due to helical formation of the gears. A stub shaft 60 is secured between the planet gear carrier disk 55 and the housing disk 25, the disk 55 and housing disk 25 being secured together by means, not illustrated in the drawings, so as to rotate in unison. In other words, the gear carrier disk 55 is in parallel spaced relation to the disk 25 forming the end closure of the housing 14 and these elements are bolted together at points angularly spaced from the angularly spaced shafts 60 so as to rotate as a unit. The sole purpose of the disk 55 is to form a second support for the stub shaft 60, or for the angularly spaced stub shafts 60, so as to strengthen the construction thereof. A double pinion 61 is mounted upon the bearing 62 encircling the stub shaft 60. The double pinion 61 includes pinion teeth 63 designed to engage the sun gear 53 and the pinion teeth 64 designed to engage the sun gear 57 on the sleeve 19. The teeth 63 and 64 form pinions of different diameters so as to provide additional speed ratios between the drive shaft and the driven shaft.

The teeth 64 of the double pinion 61 also engage the internal ring gear 52 so as to complete a second epicyclic gear system. The planet gear means or double pinion 61 is carried by the stub shaft 60 which revolves about the driven shaft 15 at the same speed as the drive shaft, as the gear carrier comprising disks 25 and 55 form part of the housing 14 which is directly connected to the drive shaft. The sleeves 17 and 19, as well as the ring gear sleeve 45, are all relatively rotatable. By holding various of these sleeves stationary and by holding various combinations of the sleeves from relative movement, varying speeds will be transmitted from the drive shaft to the driven shaft 15.

The clutch R will be described in connection with the transmission, as it is embodied directly within the transmission housing 14. This clutch R may be constructed as best indicated in Figure 11 of the drawings. The internal surface of the flange 21 of the gear casing 14 is provided with oppositely disposed arcuate surfaces, and with a pair of oppositely disposed pockets 65. These pockets 65 have a base portion 66 which is concentric with the casing 14. The ends 68 of the pockets 65 are inclined or cam-shaped to guide the cooperating vanes inwardly or outwardly in the manner which will be hereinafter described. The rotor 40 is provided with a series of slots 67 therein which support radially projectable vanes 69. The vanes 69 are urged outwardly into the pockets 65 by means of springs 70 mounted at the base of the vanes. A passage 71 is connected through the housing disk 20 from each end of each pocket 65 to a ring-shaped valve chamber 72 within the hub 13. The valve chamber 72 contains a ring-shaped axially slidable valve 73 which is urged in a position to close the passages 71 by means of a spring 74. By application of pressure through a pressure port 75, the valve 73 may be moved slidably to the left as viewed in Figure 3 of the drawings, opening the passages 71 and inter-connecting these various passages. When the passages 71 are inter-connected the rotor 40 may rotate with respect to the housing 14, thereby permitting relative movement between the planet gear carrier 36, 50 with respect to the casing 14, and accordingly with respect to the drive shaft. When the valve 73 is closed, however, the rotor 40 and accordingly the gear carrier 36, 50 is locked with respect to the casing 14.

Upon the application of sufficient pressure, which is transmitted past the valve 73 through the passages 71 to the pockets 65, the vanes 69 will be held inwardly by pressure, thus permitting free rotation of the rotor 40 with respect to the casing or housing 14 with the radially slidable vanes 69 retracted.

The operation of the transmission may be described as follows. When a reverse speed is to be transmitted to the driven shaft 15 while the drive shaft rotates in a forward direction, the valve 73 is closed so that the rotor 40 is locked with respect to the drive shaft. Simultaneously, a locking means, which will be later described, is set into operation, which will halt rotation of the sleeve 17, thereby stopping rotation of the sun gear 53. With the sun gear 53 held stationary, rotation of the drive shaft causes rotation of both of the gear carriers 36, 50 and 25, 55 in unison as the gear carrier 36, 50 is locked to the rotor 40. Power is then transmitted through the double pinion unit 61 to the ring gear 52 which operates in unison with the ring gear 44. Thus the rotation of the ring gear 44 is controlled by holding the sun gear 53 stationary, and as the gear carriers supporting the double pinions 33 and 61 rotate in unison with the drive shaft, a reverse rotation is transmitted from the gear 32 to the sun gear 30 on the driven shaft 15.

In further explanation, as the sun gear 53 is held fixed and as the gear carriers rotate at the same speed, the double pinion unit 61 revolves about the sun gear 53, which causes the ring gears 52 and 44 to rotate in set relation thereto. The sun gear 30 on the driven shaft 15 is revolved in a reverse direction faster than it is carried forward by the transmission, acting to rotate the driven shaft 15 in a reverse direction at a ratio of 5.24 to 1 with respect to the drive shaft in the transmission illustrated.

In order to place the transmission in neutral position the valve 73 remains closed but the sleeve 17 is released, permitting the sun gear 53 to rotate. Because of the closure of the valve 73 the clutch R remains locked rotating the rotor 40 in unison with the casing 14. Therefore, as in the case of reverse speed, both planet gear carriers are rotated in unison with the drive shaft.

As there is no restriction on the movement of any of the sun gears in this position the double pinions 33 and 61 merely idle about their respective sun gears, exerting no power upon the driven shaft 15. As a result no driving power is transmitted to the driven shaft 15, and therefore the transmission is in neutral.

When it is desired to move the driven shaft 15 forwardly at a low rate of speed, the clutch R remains engaged to lock the rotor 40 to the casing 14, and in addition the sleeve 19 is held from rotation, thereby holding the sun gear 57 stationary. The double pinion 61 is then caused to rotate about the sun gear 57. By means of the double ring gear 52, 44 movement is transmitted to the double pinion unit 33 which causes rotation of the sun gear 30 on the driven shaft 15. The relative rotation of the gear units 61 and 33 provides a forward rotation of the driven shaft of 5.77 to 1 with respect to the driving shaft in the particular transmission illustrated.

When an increased speed of the driven shaft 15 is required, the sleeve 19 is released, and the sleeve 16 is held from rotation. The clutch R remains locked so that both planet gear carriers rotate in unison. This action stops rotation of the sun gear 42, causing the double pinion unit 33 to rotate about the sun gear 42, and causing the gear 32 of this unit to rotate the sun gear 30 on the driven shaft 15 at a speed ratio of 3.95 to 1 in the transmission illustrated with respect to the drive shaft.

When the next higher speed of the driven shaft is desired, the clutch R is released, while the sun gear 42 remains stationary. At the same time means are provided to lock the sun gear 53 from rotation. This locking of the sun gears 42 and 53 from rotation results in a rotation of the ring gear 44, 52 and of the double gear unit 33 which will drive the driven shaft 15 at a speed ratio of 2.47 to 1 with respect to the drive shaft in the particular transmission illustrated.

When the next higher speed of the driven shaft is desired, the sun gears 53 and 42 remain clutched together for rotation in unison and at the same time the sun gear 57 is braked and thus held stationary. In this position the sun gears 42 and 53 are not held stationary, but are merely clutched against relative rotation while the sun gear 57 is locked in stationary position. The gear unit 61 is forced to revolve about the sun gear 57 and to provide a definite rate of rotation of the ring gear unit 44, 52 and of the sun gears 42 and 53. This action produces a rate of rotation of the driven gear 30 on the driven shaft 15 which is 1.71 to 1 with respect to the drive shaft in the particular transmission illustrated.

In the next higher speed of the driven shaft 15, this driven shaft 15 is rotated at the same speed as the drive shaft. This result is accomplished by maintaining the sun gears 30, 42 and 53 locked for rotation in unison and in holding these sun gears locked from rotation with respect to the driven shaft. This action results in holding the sun gears 30 and 42 from relative rotation, and as both of these gears are engaged by the double pinion unit 33, all of the gears are locked from relative rotation and the entire transmission rotates in unison.

When an over-drive speed of the driven shaft 15 is desired the sun gear 42 remains clutched to the driven shaft and simultaneously the sun gear 57 is held from rotation. The double pinion unit 61 is then forced to rotate about the fixed sun gear 57, rotating the ring gear unit 44, 52 to rotate the double pinion unit 33. As the sun gears 30 and 42 are clutched together against relative rotation the planet gear unit 33 can not rotate, therefore preventing relative rotation of the ring gear 44 with respect to the planet gear unit 33. Thus one epicyclic gear system is locked from rotation and as the sun gear of the other epicyclic gear system is held fixed, the drive shaft 15 must rotate with the ring gear 44, 52 at a higher rate of speed than the drive shaft. The driven shaft is thus rotated at the ratio of 1 to 1.38 with respect to the drive shaft in the transmission illustrated.

When a higher rate of over-drive is required the sun gear 42 remains locked from rotation with respect to the driven shaft 15, thus holding the corresponding epicyclic gear train locked from relative rotation and causing the driven shaft to remain locked to the ring gear unit 44, 52. However, in this speed ratio the sun gear 57 is released and the sun gear 53 is held from rotation, thus causing the double gear unit 61 to rotate around the larger sun gear 53 and thereby transmitting increased speed of rotation to the ring gear unit 44, 52. In the transmission illustrated the speed ratio is 1 to 1.55 with respect to the drive shaft when thus controlled.

*The clutch and brake system*

From the foregoing description of the transmission operation, it will be obvious that various locking means are required for the sun gears 42, 53, and 57. In order to control rotation of these sun gears they are independently mounted on their respective sleeves 16, 17, and 19 and for convenience these respective sleeves are held from rotation or locked to rotate in unison as required.

The clutch holding the two planet gear carriers locked for rotation in unison has already been described as clutch R. A brake A is provided for locking sleeve 19 stationary. A brake B is provided for locking sleeve 16 stationary. A clutch C is provided for locking sleeve 16 to the driven shaft 15. A brake D is provided for locking sleeve 16 stationary. A clutch E is provided for holding sleeves 16 and 17 locked together. These five devices are divided into three units; brake A forming one unit, brake B and clutch C forming a second unit, and brake D and clutch E forming a third unit. The operation of the last two of these units, and the construction thereof is virtually identical.

Actuation of these clutches and brakes holds certain of the sleeves stationary, or locked together for operation in unison. The following table lists a number of speed ratios the transmission illustrated may attain, together with the clutches and brakes which must be engaged to produce these ratios.

| Speed | Motor | Driven | C | B | E | D | A | R |
|---|---|---|---|---|---|---|---|---|
| Reverse | 5.24 | 1 |  |  |  | x |  | x |
| Neutral | 0 | 0 |  |  |  |  |  | x |
| First | 5.77 | 1 |  |  |  |  | x | x |
| Second | 3.95 | 1 |  | x |  |  |  | x |
| Third | 2.47 | 1 |  | x | x |  |  |  |
| Fourth | 1.71 | 1 |  |  | x |  | x |  |
| Fifth | 1 | 1 | x |  | x |  |  |  |
| Sixth | 1 | 1.38 | x |  |  |  | x |  |
| Seventh | 1 | 1.55 | x |  |  | x |  |  |

Attached to the end of the frustro-conical housing 10 opposite the end bearing the flange 11, we provide a substantially cylindrical casing section 76. A similar section 77 adjoins the section 76 and a third section 79 adjoins the casing section 77. The section 76 is designed to enclose the brake A. The section 77 is designed to accommodate a double acting clutch and brake, comprising brake D and clutch E. The casing section 79 is designed to accommodate a second double acting clutch and brake, comprising brake B and clutch C respectively. An end plate 80 closes the section 79 so as to form a complete housing.

The brake A is best illustrated in Figures 3 and 12 of the drawings. The rotor hub 81 is splined to the sleeve 19 to rotate therewith. A ring-like web 82 extends outwardly from the hub 81 to support a substantially circular rotor 83. The rotor 83 is slotted at angularly spaced points 84 to accommodate vanes 85 which are radially slidable in the slots 84.

The casing section 76 is bored internally to fit closely adjacent the outer periphery of the rotor 83 throughout somewhat less than one-half the circumference thereof. A pair of opposed pockets 87 are provided, however, on opposite sides of the rotor into which the vanes 85 may extend. The pockets 87 are provided with elongated cylindrical segments 89 connected to the smaller diameter portions of the internal bore by inclined cam portions 90, which guide the vanes inwardly into the rotor or outwardly therefrom.

The brake A is designed for the express purpose of holding the rotor 83 from rotation with respect to the casing section 76. When hydraulic fluid is trapped in the pockets 87, and when the vanes 85 project into these pockets, the rotor 83 is held from rotation. However, when the oil is allowed to escape from or to flow out of the pockets 87, or when the vanes 85 are held retracted into the rotor, rotation of the rotor 83 with respect to the casing section 76 is possible.

In order to hold the vanes 85 retracted to permit free rotation of the rotor 83 within the casing section 76, we provide a plunger 91 having a point 92 thereon designed to engage in a recess 93 in each of the vanes 85. The plunger 91 is urged against its corresponding vane 85 by a spring 94 which is adjustably held in place by a plug 95. Thus as each vane 85 engages the inclined end 90 of a pocket 87, and is retracted into the rotor 83, it will be engaged by the point 92 of the plunger 91, unless means are provided for holding the plungers retracted. In other words, in the absence of any means for holding the plungers 91 retracted, each plunger will engage its corresponding vane as soon as the vane is retracted by rotation of the rotor with respect to the casing section 76, and will lock the vane in retracted position.

In order to hold the plungers 91 from engagement with the vanes we provide a hydraulic pressure passage 96 through the end wall 97 of the casing section 76, which communicates through a ring-shaped groove 98 with a transverse passage 99 through each vane 85 to the aperture 93 in the vane. When pressure is exerted through the passages 96 and 99 in a manner which will be later described in detail, this pressure will retract the plunger 92, thereby acting to withdraw the point 92 of the plunger from the aperture 93. The vanes are then free to move outwardly in the slots 84, being moved outwardly by centrifugal force and by springs 100 between the vanes and the rotor 83.

A hydraulic cushion to reduce shock of engagement is provided by the hollow interior of the rotor 83. This chamber within the rotor is always partially filled with air; and sleeved passages 98 communicate therewith in such a manner that fluid forwardly of the vanes 85 may be compressed into the air chambers.

In order to segregate the brake mechanism from the transmission mechanism and to form a support for the transmission elements, the conical portion 10 of the housing is provided with an end wall 101 which terminates in a hub 102 in spaced relation to the hub 23 of the transmission casing 14. A bearing 103 separates the hubs 23 and 102, and permits relative rotation between the transmission housing 14 and the outer housing 10.

The end wall 97 of the casing section 76 supports a ball bearing 104 which separates the inner extremity of the wall 97 from the hub 105 of the rotor 106 of the combined clutch and brake mechanism E—D within the casing section 77. The hub 105 is spline connected at 107 to the sleeve 17 and the sun gear 53 mounted thereupon.

Figure 2:
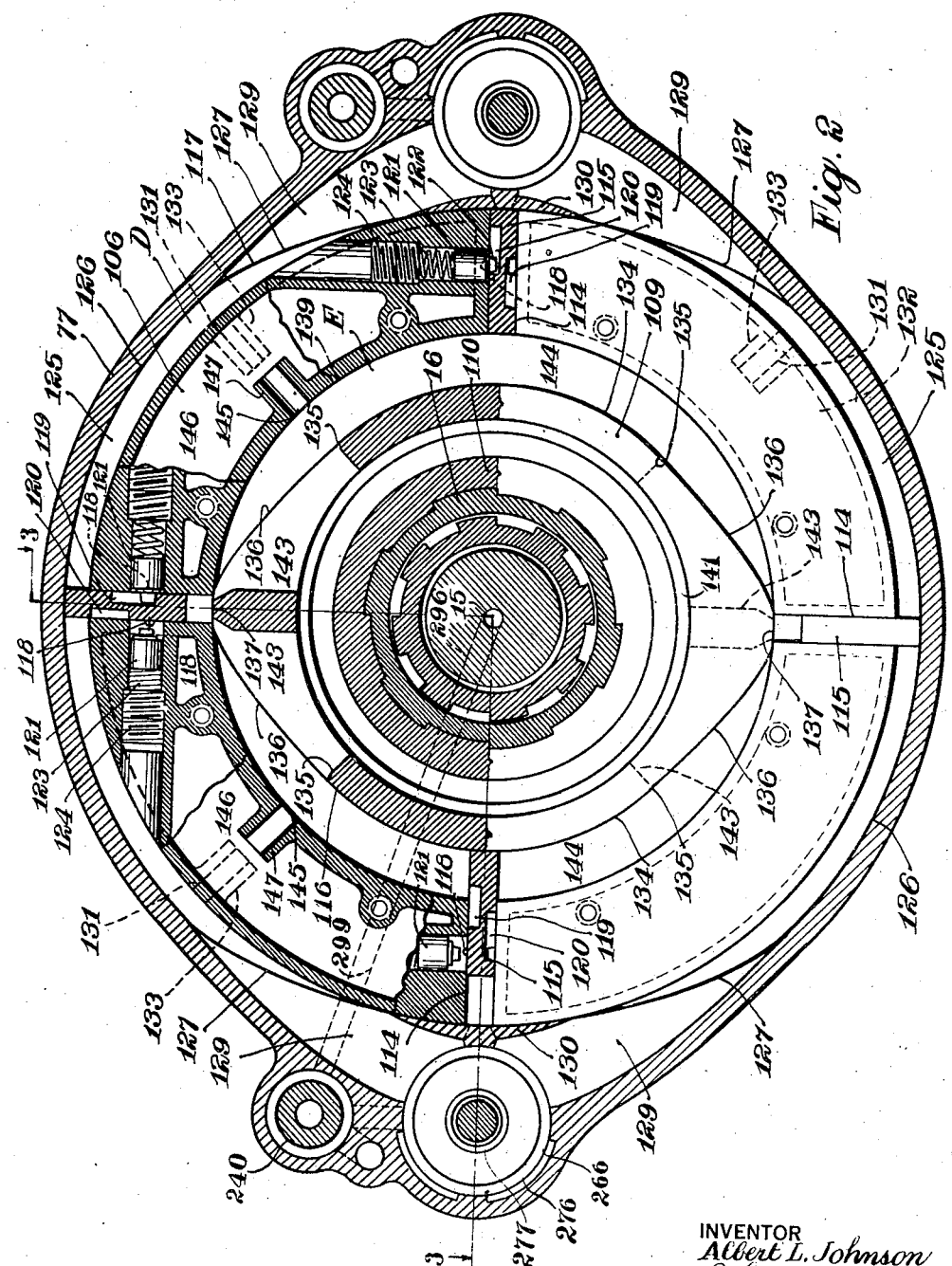
Figure 2 is a transverse section taken substantially on the line 2—2 of Figures 1 and 3.

The manner in which the housing section 77 is constructed is best illustrated in Figures 2 and 3 of the drawings. A cam 109 is provided with a hub 110, spline connected at 111 to the sleeve 16 bearing the sun gear 42. This cam 109 is supported between the sides 112 and 113 of the rotor 106 to be spline connected to the sleeve 17. The rotor 106 includes a series of slots 114 for slidably supporting double acting vanes 115. The vanes 115 when moved inwardly may engage against the cam surface 116 of the inner cam member 109, forming clutch E. On the other hand, when these vanes 115 are projecting outwardly from the rotor 106 they may engage against the cam-shaped surface 117 of the casing section 77, forming brake D. The purpose of the vanes 115 is to lock the rotor 106 with respect to the casing 77 when the vanes are projecting outwardly and to lock the rotor 106 and the internal cam 109 for rotation in unison when these vanes are projecting inwardly.

Each vane 115 is provided with a slot 119 in one surface thereof leading toward the outer extremity of the vane. A second slot 120 is provided in the opposite side thereof. A plunger 121 is mounted adjacent each side of each vane 115 in the rotor 106 and positioned with its axis substantially normal to the plane surface of the adjacent vane 115. Each plunger 121 is provided with a tip end or point 122 designed to engage in the slot 119 or 120 so as to hold these vanes from inward or outward movement. Spring means 123 are provided for urging each plunger 121 into its cooperable slot 119 or 120. An adjustable plug 124 is provided for adjusting the tension of each spring 123.

Therefore, it should be noted that the plunger points 122 normally engage in a slot 120 to lock the vane self-contained within the outer periphery of the rotor 106, but permit the vanes to slide inwardly. However, upon retraction of the cooperable plungers the points 122 thereof are disengaged from the slots 120 to permit the vanes to slide outwardly. The plungers 121 are retracted by oil under pressure passing through transverse passages 118 adjacent the vanes 115. The grooves 119 permit free outward movement of the vanes when outward pressure is exerted upon the same, and limit inward movement thereof. The cooperable plungers 121 may be retracted by oil pressure passing through the cooperable passage 118, allowing the vanes 115 to slide inwardly.

When the vanes 115 are in their outwardly projecting position illustrated near the top of Figure 2 of the drawings, these vanes may extend into the opposed pockets 125 formed in the casing section 77. Each pocket 125 includes an arcuated section 126 concentric with the rotor 106 and terminates in a cam incline 127 at each end thereof so as to guide the vanes 115 inwardly or outwardly. Thus when the plungers 121 in the slots 120 are retracted so that the vanes can move into engagement with the cam surface 117 of the casing section 77 the vanes gradually move outwardly along the cam incline 127 until they reach the arcuated section 126 concentric with the driven shaft and remain on this arcuated section for a considerable period of time.

Hydraulic liquid in the pockets 125 may by-pass the vanes 115 when the vanes are on the cam inclines 127 of the cam surface 117. A pocket or recess 129 extending a portion of the width of the vanes 115 communicates with the cam inclines 127 and with the control valve therefor, so that as soon as the vanes 115 come in communication with the cam inclines the pressure may equalize on opposite sides of the vanes. We have found that the vanes 115 then have a tendency to snap inwardly, due to pressure on the extremity.

The vanes 115 are therefore not in operation unless they are in engagement with the arcuated surface 126 of the pockets. When thus engaged the hydraulic fluid can not by-pass the vanes and pressure may be built up in advance of the vanes so as to lock the rotor 106 with respect to its casing 107. The vanes 115 are angularly spaced so that two opposed vanes are always in position to engage the arcuated surface 126 of the opposed pockets 125. When one of the vanes 115 engages the cam incline 127 after traversing the entire length of the arcuate surfaces 126, the next adjacent vane is just leaving the cam incline 127 at the other end of the pocket 125 and therefore is coming into operation. This is extremely important as there is no great pressure on any one side of the vanes 115 during their sliding movement because the pressure is equalized on both sides of the vanes during their sliding movement.

The pocket or passage 129 is in the form of a passageway leading from each end of each pocket 125 to its respective control valve which will be later described. Intermediate the pockets or passages 129 we provide an arcuated closed segment 130 between the cam portions 127 of the cam surfaces 117 of the casing section 77 which is longitudinally slotted except at its mid-point. When the outer ends of the vanes 115 are in engagement with the arcuated segment 130, these vanes are fully retracted into the rotor 106.

In order to cushion the action of the vanes 115 in holding the rotor 106 from relative rotation with respect to the casing section 77 the rotor 106 is hollow and is divded into two axially spaced chambers separated by a central partition wall. Openings 131 through the outer wall of the rotor 106 lead to the interior thereof and the rotor may be partially filled with hydraulic fluid because of the fact that the openings 131 into one of the chambers 132 are provided with inwardly extending sleeves 133. However, the entire chamber 132 can not fill with oil, but contains a certain amount of air which may act as a cushion to the action of the vanes. In other words, when the vanes 115 are in the position shown in Figure 2, the hydraulic fluid trapped in the pockets 125, forwardly of the vanes 115 may be partially forced into the interior of the rotor, compressing the air therein and decreasing shock by permitting the rotor to stop gradually.

For each vane 115 is provided a passage 128 through the casing connecting the slot 120 therethrough with the inner end of the vane. Hydraulic fluid under pressure may pass through the passages 128 and through the transverse passages 118, holding the plungers 121 retracted. Hydraulic pressure acting upon the outer ends of the vanes 115 may force the same inwardly.

The vanes 115 may also co-act with the cam surface 116 of the cam 109. As has been previously explained the cam 109 is provided with a hub 110 which is spline connected to the sleeve 16 encircling the shaft 15. The cam surface 116 is provided with opposed arcuate sections 134, but the arcuate portions 134 terminate at the points 135 where the surface blends into inclined cam portions 136. Each pair of opposed inclined cam portions 136 terminate in a large diameter portion or cam point 137 of a diameter to fit closely within the inner surface 139 of the rotor 106. In other words, the points 137 of the internal cam 109 closely contact the inner surface of the rotor 106, while opposite halves of the cam surface 116 are formed by the arcuated portions 134. Thus if the vanes 115 are urged inwardly against the cam surface 116, they will move inwardly the greatest amount throughout contact with the arcuated portions 134 of the surface. The vanes 115 will then be urged outwardly by the inclined cam portions 136 until they are fully retracted into the rotor 106. The vanes will then travel down the next inclined cam portion 136 until they engage the next adjacent arcuated surface 134. The vanes 115 thus reciprocate twice during each rotation of the internal cam 109.

As best illustrated in Figure 3 of the drawings, a ring-shaped slot or recess 140 is formed in the cam rotor 109 to receive a ring-shaped axially slidable valve 141. The valve 141 is normally urged in one direction by a spring 142. Passages 143 lead through the wall of the cam adjacent each inclined portion 136 thereof so that while the vanes 115 are in engagement with these inclined portions 136, hydraulic fluid may by-pass the blades. Furthermore, while the valve member 141 is in the position illustrated in Figure 3 of the drawings, the hydraulic fluid can freely flow through the grooves 140 from one opening or passageway 143 to the next. The wall of the cam 109 is solid adjacent the arcuated surfaces 134 and also at the opposite points 137 of the cam, the openings 143 being positioned between the extreme points of the cam and the arcuated surfaces 134 thereof.

When the vanes 115 are inwardly projecting against the cam surface 116 the hydraulic fluid pumped by the vanes can freely flow from one passage 143 to the next adjacent passage when the valve 141 is open. However, when the valve 141 is moved to the right from the position illustrated in Figure 3 so as to close the passage between the passages 143, the fluid within the pockets 144 formed between the rotor 106 and the internal cam 109 on opposite sides of the points 137 of the cam, will be trapped therein and a relative rotation between the rotor 106 and the cam 109 can not take place. Therefore when thus engaged these two elements must rotate in unison.

In order to cushion the shock of engagement between the rotor 106 and the cam 109, we provide openings 145 through the inner wall of the rotor 106 leading into chambers 146, occupying one-half of the hollow volume of the rotor and spaced axially from the chamber 132 into which the openings 131 extend. These openings 145 are each provided with an outwardly extending sleeve 147 which prevents the entire chamber from filling up with hydraulic liquid and therefore provides an air cushion which may compress to some extent under pressure so as to cushion the shock of engagement between the elements 106 and 109.

The brake B and clutch C, illustrated in Figure 3, are virtually identical with the brake D and clutch E which have been described, with the exception of the hub structure. The internal cam 149 of the clutch C is identical to the internal cam 109 with the exception that the hub 150 thereof is of somewhat smaller diameter than the hub 110 and is spline connected at 151 directly to the driven shaft 15. A rotor 152, substantially identical to the rotor 105, is provided with a hub 153, spline connected at 154 to the sleeve 16. Externally of the hub 153 is provided a bearing 155 to separate the hub 153 from the end wall 156 of the casing section 77. This casing end wall 156 extends between the side plate 112 of the rotor 106 and the side plate 157 of the rotor 152. The side wall 157 of the rotor 152 extends along one end of the cam 149. The other side plate 159 of the rotor 152 extends along the opposite side of the cam 149, thus enclosing the cam 149 between the rotor plates 157 and 159. The side plate 159 is supported by a bearing 160 encircling the driven shaft 15.

A ring-shaped slot 161 is provided in the cam 149 to accommodate the slidable valve 162 which is normally urged into open position by a spring 163. When urged in the opposite direction to compress the spring 163, the valve 162 is in position to close the openings 164, which are identical with the openings 143 and accomplish the same purpose.

The vanes 165 mounted in the rotor 152 are identical with the vanes 115 in the rotor 106, and the casing section 79 is provided with an internal cam surface 166, identical with the internal cam surface of the casing section 77, illustrated in Figure 2 of the drawings. Passages 167, identical with the pockets or passages 129, relieve pressure on the vanes 165 when the vanes are engaging a portion of the cam surface 166, which would tend to move the vanes longitudinally or permit such longitudinal movement.

In other words, a sectional view of the brake B and clutch C contained within the casing section 79 would be identical with the section shown in Figure 2, except for the fact that the cam 149 is keyed to the shaft 15, rather than to the sleeve 16. The method of operation and construction of the brake B and clutch C is otherwise identical with that of brake D and clutch E.

The driven shaft 15 may operate any suitable device, but it most frequently is connected to a universal joint, such as 169. In such instance, the end of the driven shaft 15 may be tapered, as at 170 for connection with a portion 171 of the universal point, and bearing means 172 may be provided between the hub 173 on the end of the closure plate 80 and the casing section 79 for this universal joint portion 171.

The control system

The clutch and brake construction used in the halting of relative movement between the various sleeves controlling the sun gears of our transmission have been described. In order to control the transmission automatically, a control means is provided which will selectively engage the various clutch and brake elements and which will therefore permit successive relative speeds between the drive shaft and the driven shaft to be built up. This control means, for controlling the clutches and brakes which have been described, will now be described in detail. Similar control units are provided on opposite sides of the housing 10; but in the interests of simplicity, but one control is illustrated in detail.

The hub 23 of the transmission housing 14 is provided with worm gear teeth 174 which operate a gear 175 on a shaft 176 extending transversely through the transmission housing 10. On each end of the shaft 176, we provide a pump 177 enclosed within an added casing portion 179 of the housing 10. As best illustrated in Figure 5 of the drawings, the pump 177 is provided with an inlet passage 180, which extends into the interior of the transmission casing 10 to obtain oil from this casing interior. The pump 177 pumps the oil thus collected through an outlet passage 181 into a pressure chamber 182 which may be of any desired shape, but which, in the construction illustrated, encircles a portion of the transmission casing 10 as best illustrated in Figure 4 of the drawings. As the upper portion of the pressure chamber 182 is preferably filled with air, an oil pressure is thus built up in the chamber for the purpose which will be hereinafter more clearly set forth.

When sufficient pressure is built up within the pressure chamber 182 the valve 183 opens automatically to allow oil to escape. The valve 183 is supported in an outlet port 184 and is urged by a spring 185 in position to close the port 184. Obviously the valve 183 will open under pressure to permit oil to flow into the chamber 186. The amount of pressure which must be built up before the valve 183 will open may be regulated by the pressure adjustment nut 187, which adjusts the tension of the spring 185. The valve 183 is inserted through a threaded port 189, normally closed by a cap 190 bearing the adjustment nut 187.

A butterfly valve 191 permits a metered amount of liquid to by-pass into the reservoir 192 formed within the transmission casing 10. Thus at idling speeds the pressure built up by the pumps 177 may be permitted to escape past the valve 191. An arm 193 is connected to the shaft of the butterfly valve 191 so that the setting of this valve may be adjusted and a connection to this arm 193 may be made to any convenient location so as to control the engagement timing of the control. Naturally the more oil which is allowed to escape past the butterfly valve 191, the longer will be the time required to build up an adequate volume of liquid to operate the control.

Figure 9:
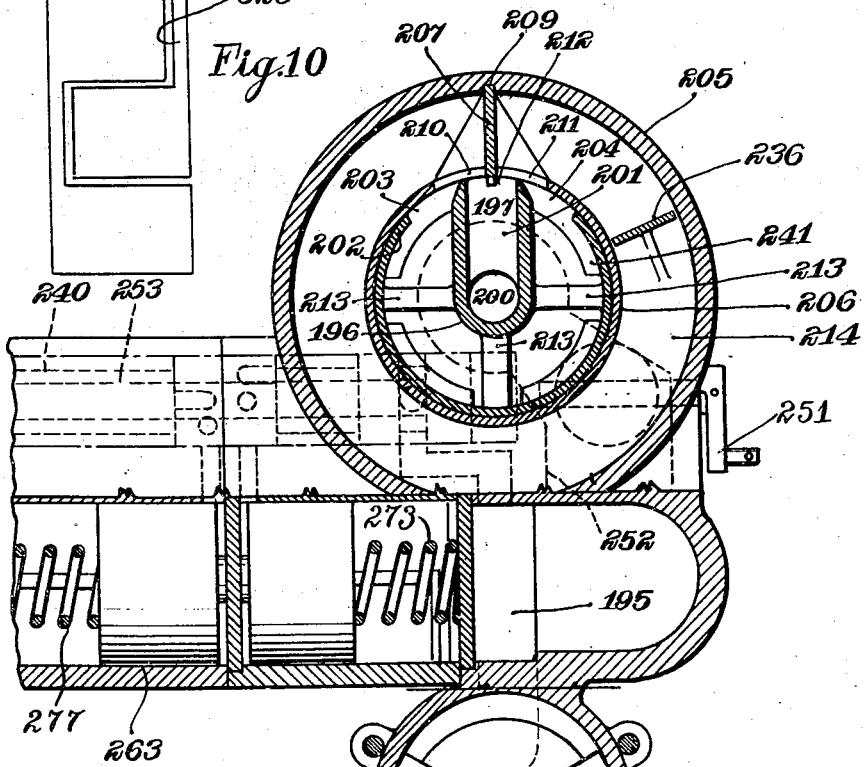
Figure 9 is a sectional view, the position of the section being shown by the line 9—9 of Figure 4.

The volume flow chamber 186 is connected by a passage 194 to a ring-shaped chamber 195 encircling the hollow shaft 196 of a rotor 197. Openings 199 through the hollow shaft 196 provide constant communication between the interior passage 200 of the shaft 196 and the passage 195 so that the volume flow chamber 186 may always be in communication with the interior of the rotor 197. The rotor 197 is constructed as best illustrated in Figures 4 and 9 of the drawings, the hollow passage 200 of the shaft 196 communicating with a radially extending passage 201 in the rotor, extending to the outer periphery thereof. The rotor 197 includes a hollow cylindrical shell 202 having openings 203 and 204 therethrough on opposite sides of the passage 201. Thus it is obvious that oil from the volume flow chamber 186 may flow through the interior shaft passage 200 and the passage 201 and into the hollow cylindrical casing shell 205 forming a part of the transmission housing 10, as best illustrated in Figure 4.

A sleeve 206 encircles the shell 202 and is provided with a radially extending partition wall 207 which is secured to the casing shell 205 at 209 by any suitable means, such as by extending the wall 207 into a groove in the shell 205. Apertures 210 and 211 are provided in the sleeve 206 on opposite sides of the partition wall 207. A projection 212 is provided on the lower end of the partition wall 207, which extends in the path of the sides of the passage 201 and which therefore limits rotation of the rotor 197. In other words, the passage 201 may be positioned as shown, in communication with the area on both sides of the partition wall 207. However, by rotating the rotor 197 a few degrees in either direction, the passage 201 may communicate solely with the space to one side or the other of the partition wall 207, thus delivering oil either exclusively through the aperture 210 or exclusively through the aperture 211.

The shell 202 of the rotor 197 is connected to the shaft 196 by means of spaced spider arms 213. A disk 214 is positioned within the housing shell 205 to be interposed between the rotor 197 and the body of the crank case which forms a shoulder 215 against which the disk 214 rotates. A hub 216 on the disk 214 is internally bored with two portions of different diameter. The larger diameter portion 217 is designed to fit over the hollow shaft 196 of the rotor 197. Hydraulic fluid passage 186 extends through this hub portion 217. The smaller diameter portion 219 is designed to fit over the shaft 220 and to be secured thereto by any suitable means, such as the pin 221. The shaft 220 is merely provided to synchronize the operation of the hubs 216 on both sides of the transmission.

Figure 7:
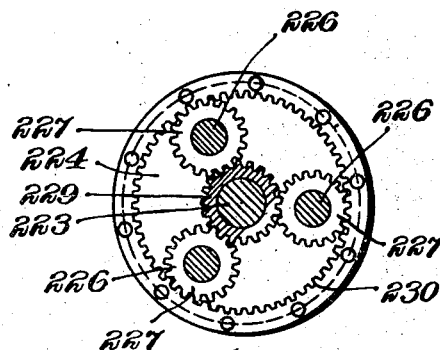
Figure 7 is a sectional view taken substantially on the line 7—7 of Figure 4.
Figure 8:
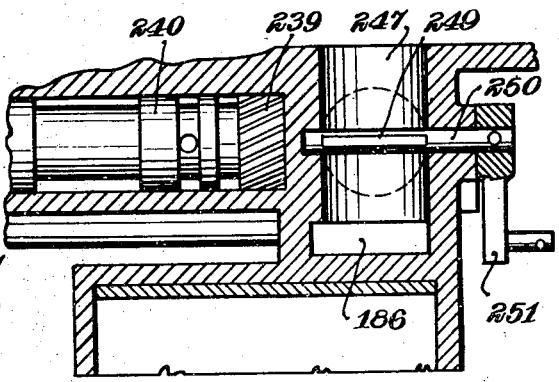
Figure 8 is a sectional view taken on the line 8—8 of Figure 4.

The closure plate 221 secured in any suitable manner to the shell portion 205 of the housing acts to close the outer extremity of this casing. A manually operable handle 222 is provided with a suitable shaft 223 extending axially through the closure plate 221. A planet gear carrier 224 is provided with a hub 225, pin connected to the shaft 223, and this planet gear carrier is equipped with axes 226 and planet gear 227. A sun gear 229 is secured to the closure plate 221 and is therefore held stationary with respect to the housing. The planet gears 227, illustrated in Figures 4 and 7 of the drawings, engage this sun gear 229 and also engage the internal ring gear 230, forming a part of a rotatable shell 231 of a diameter equal to that of the shell 203. A spiral spring 232, illustrated in Figures 4 and 6 of the drawings, is anchored at its inner end 233 to the planet gear carrier 224, while at its outer end 238, this spring 232 is connected to the rotor 197. This spring 232 forms a resilient connection between the rotatable shell 231 and the rotor 197 for movement in one direction. A projection 234 on the rotor 197 engages a cooperable projection 235 to positively rotate the two elements in unison when the handle 222 is operated in the opposite direction.

The disk 214 is provided with a paddle or vane 236, best illustrated in Figure 9 of the drawings, which substantially fills the space between the shell 203, the shell 231, and the outer housing 205. This vane 236 extends from the disk 214 to the closure plate 221 so that when pressure is built up on one side of the vane due to the volume of oil within the housing 205, rotation of the disk 214 will be caused. The hub 216 of the disk 214 is provided with worm teeth 237 which are designed to engage the gear 239 mounted on the end of the rotary control valve 240. Thus operation of the control valve 240 is caused by rotation of the disk 214, which in turn is rotated by oil pressure acting against the vane 236 mounted thereupon. A spring 238 returns the disk 214 to starting position when pressure against vane 236 is released.

The exhaust passage from the control device is provided through openings 241 in the disk 214, allowing the fluid to flow through the outlet passage 242, about the hub 216, and through the passage 243 around the shaft 220 leading into the oil reservoir within the casing 10. It will therefore be obvious that oil may escape from the interior of the rotor shell 202 and accordingly from the interior of the rotary sleeve 231, which abuts against the rotor 197, and which has no end wall to prevent the flow of fluid to the exhaust.

An aperture 244 is provided in the shell 231 through which hydraulic fluid may flow. The position of this aperture 244 is regulated by rotation of the control handle 222 for the purpose which will be hereinafter set forth. The shell 231 is held in adjusted position by the ball detent 245 which is urged into one of a series of angularly spaced indentations in the sleeve 231 by a spring 246.

Connected to the pressure passage 186 leading through the transmission casing to the reservoir on the interior thereof, we provide a hydraulic fluid passage 247. A butterfly valve 249 is mounted on a shaft 250 extending through the passage 247, and an arm 251 is mounted on the shaft 250 externally of the housing for use in rotating the shaft 250, and accordingly the butterfly valve 249. This arm 251 is connected by any suitable means to the accelerator of the engine to which the transmission is mounted. As a result the butterfly valve 249 is closed at idling speeds of the motor and gradually opens to exhaust some of the oil being pumped by the pump 177 which is diverted back to the reservoir through the passage 247, and the amount of oil thus by-passed increases as the speed of the engine increases. This prevents the building up of an excessive volume of oil within the control casing. The pressure of the oil in chamber 186 is regulated by the foot accelerator, so that the more the accelerator is open, the slower will be the rotation of the vane 236, and the slower will be the speed change in the transmission. When valve 249 remains stationary, the speed change increases while the engine slows until a balance is reached.

Having now described the construction of the manually controlled means used for controlling the engine, we will now explain the operation of this control. It will be understood that the purpose of the control is to regulate the position of the control valve 240, which controls the hydraulic fluid pressure to the various clutches and brakes. The various passages from the control valve 240 will be later described in detail.

When the drive shaft starts to rotate, the hub 23 starts to revolve and the worm gear teeth 174 act to drive the gear 175 on the shaft 176. The pump 177 is then set in motion pumping oil from within the casing 10 to the pressure chamber 182 which acts to build up pressure in this pressure chamber. When the pressure reaches a predetermined maximum, the valve 183 opens, allowing oil to flow into the passage 186. If the engine is rotated at an idling speed, sufficient oil will by-pass past the butterfly valve 191 to prevent high pressure from being built up within the control. Oil passing through the passage 186 is communicated through the opening 200 in the hollow shaft 196 and through the passage 201. This oil may flow back through the openings 210 and 211 into the interior of the shell 202, from which position it may escape through the openings 241 in the disk 214, then passing through passages 242 and 243 to the reservoir. Obviously in this neutral position or setting of the control illustrated in Figure 9 the control valve 240 will not be operated.

Let us first consider that the manual control handle 222 is rotated in a counter-clockwise direction until the handle indicates reverse. In such an instance the projection 235 on the planet gear carrier 224 strikes the projection 234 on the rotor 197, rotating this rotor until the passage 201 communicates solely with the opening 210 in the shell 203. If the engine remains at idling speeds insufficient pressure will be built up to actuate the control. However, during this rotation of the control handle 222 the shell 231 is rotated so that the opening 244 is in a slightly counter-clockwise direction from the vane 236. Therefore as the speed of the engine is increased, hydraulic fluid under pressure will be forced through the passage 201 and into the space between the rotatable shells 206 and 231, and the outer casing 205 to the left of the partition wall 207, as viewed in Figure 9 of the drawings. This pressure may only escape through the opening 211 or through the aperture 244 in the shell 231. As neither of these openings is uncovered in the starting position of the vane 236, the disk 214 is rotated by pressure against the vane 236 in a counter-clockwise direction until the vane passes a portion of the opening 244, whereupon the fluid pressure may escape to the reservoir by passing through the interior of the shells 202 and 231 in the manner which has been described. This rotation of the disk 214 acts through the gear teeth 237 and the gear 239 to rotate the valve 240 so as to apply the proper brakes and clutches to cause a reverse motion of the drive shaft 15.

Let us now say for example, that it is desired to rotate the shaft 15 in the lowest or first forward speed. The control handle 222 is rotated in a clockwise direction until first forward speed is indicated. Clockwise rotation of the control handle 222 acts through the planet gear system described to rotate the shell 231 in a clockwise direction. Tension is also exerted on the spring 232 to rotate the rotor 197 into its other extreme position. Accordingly the passage 201 is rotated out of communication with the opening 210 in the sleeve 206 and into communication with the opening 211 in this sleeve. If the engine is travelling at idling speed, sufficient pressure will not be built up to operate the control. Upon increasing the speed of the engine, however, pressure is built up which issues through the passage 201 and through the opening 211 to exert pressure against the vane 236, tending to rotate this vane, and the disk 214 to which it is secured, in a clockwise direction, as viewed in Figure 9.

In first forward speed the opening 244 in the shell 231 is positioned in a clockwise direction from the vane 236. Thus in order to escape through this opening 244 to the exhaust the disk 214 is rotated in a clockwise direction until the vane 236 passes a portion of the opening 244, allowing the hydraulic fluid to exhaust. Therefore, as long as sufficient speed is maintained in the driving unit the drive shaft will be rotated at first or lowest speed. For each successive forward speed of the drive shaft from a lowest or first speed to seventh or super over-drive speed, the shell 231 is rotated a greater extent so that the vane 236 must rotate a greater distance to uncover this exhaust opening. Therefore, the speed at which the manual control handle is set determines the maximum speed ratio which may be attained for any setting of the control handle, the vane 236 rotating the disk 214 and the gear 237 on the hub thereof, to rotate the gear 239 and the control valve 240. However, in order to attain this speed the transmission must by-pass through each of the lower speed ratios, as the vane 236 slowly revolves to its maximum position according to the setting of the control handle 222. Accordingly, if it is desired to drive the driven shaft at the highest speed attainable, depending upon torque and engine speed, it is only necessary to move the control handle to its extreme position to indicate seventh speed or super over-drive position. Then as the speed of the engine increases the vane 236 will successively pass through each of the first seven speeds until this vane finally reaches super over-drive position, whereupon additional hydraulic fluid pumped will by-pass through the exhaust opening 244. Accordingly when set at any maximum speed ratio the transmission will automatically and successively pass through the various lower speed ratios until either the highest speed ratio is attained or until an intermediate speed ratio is attained, which is the greatest which can be attained for the engine speed and torque relation.

As has been previously explained, the fluid passes through the valve 183 and into the volume flow chamber 195. This chamber 195, as best illustrated in Figure 9, is connected by a passage 252 which leads to the end of the control valve 240. The control valve 240 is hollow, having a passageway 253 passing lengthwise through the same. The control valve 240 is provided with four valve portions 254, 255, 256, and 257, which are of larger diameter than the intermediate connecting portions 259, 260, and 261. The larger diameter portions 254 through 257 fit closely within the valve cylinder 262 which forms a part of the casing 10. Various passages are formed from the axial passage 253 to various portions of the control mechanism in order to actuate these cooperating parts.

A cylinder 263 extends parallel to and adjacent the control valve cylinder 262. As best illustrated in Figures 1, 3, and 9 of the drawings, this control cylinder 263 is divided into three longitudinally spaced separate cylinders. The first of these cylinders 264 is separated from the pressure chamber 182 by means of an end wall 265 and is separated from the second aligned cylinder 266 by a partition wall 267. Similarly the cylinder 266 is separated from the next aligned cylinder 269 by the partition wall 270. The other end of the cylinder 269 is provided with an end wall 271.

A piston valve 272 is slidably positioned within the first cylinder 264 and is normally held in one extreme position by means of a spring 273. In preferred form the piston valve 272 is hollow so as to require a minimum amount of weight. A boss 274 on the end of the piston valve 272 engages the partition wall 267 in extreme position of the piston valve, thereby leaving a small space 275 between the end of the piston valve 272 and the wall 267.

The cylinder 266 is provided with a piston valve 276 therein which is normally urged in one extreme position by a spring 277. A boss 279 on the piston valve 276 spaces this valve from the wall 267 in extreme position thereof. The cylinder 269 is provided with a piston valve 280 which is urged into one extreme position by the spring 281. A boss 282 on the piston valve 280 prevents this piston valve from engaging against the wall 270 in extreme position.

A passage 283 connects the left hand end of the cylinder 264 to the control valve cylinder 262 at a point opposite the enlarged portion 255 of the control valve 240. The right hand end of the cylinder 264 is connected by a passage 284 to an exhaust pressure passage 285 extending parallel the axes of the cylinders 263 and 262. Thus the right hand end of the cylinder 263 always communicates with the exhaust passage while the left hand end of the cylinder may, upon proper operation of the control valve 240, be subject to pressure.

The right hand end of the cylinder 266 is provided with a passage 286 which communicates with the valve cylinder 262 opposite the enlarged portion 255 of the control valve 240. The space 287 encircling the small diameter portion 260 is connected to the exhaust passage 285 by the passage 289. The left hand end of the cylinder 266 is connected by a passage 290 to the valve cylinder 262 opposite the enlarged diameter portion 256 of the control valve 240. Thus either end of the cylinder 264 may be subject to pressure depending upon the position of the control valve 240.

A passage 291 connects the right hand end of the cylinder 269 to the control valve cylinder 262 opposite the enlarged diameter portion 256 of the valve 240. A similar passage 292 connects the left hand end of the cylinder 269 to the control valve cylinder 262 opposite the enlarged diameter portion 257 of the valve 240. The space 293 encircling the small diameter portion 261 of the control valve 240 is connected to the exhaust pressure passage 285 by a passage 294.

In Figures 2 and 3 of the drawings it will be noted that a passage 295 extends through the shaft 15 axially thereof. This passage 295 communicates with the passage 75 leading to the valve chamber of the slidable valve 73. The other end of the passage 295 communicates through outwardly extending passage 296 to a collector groove 297 which communicates through the passage 299 with the cylinder 262 of the control valve 240 opposite the enlarged portion 257 thereof.

Figure 13:
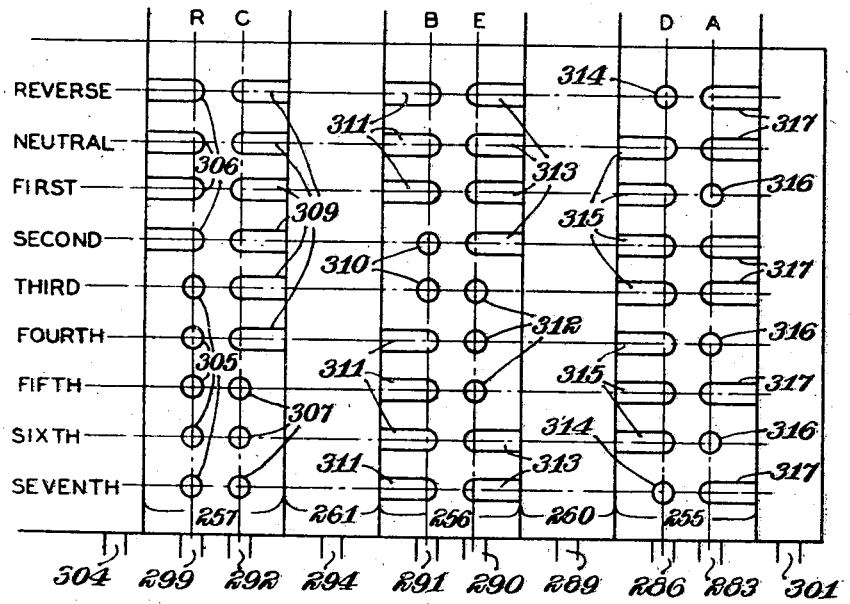
Figure 13 is a diagrammatic view of the control valve.

As best illustrated in Figure 13 of the drawings, the control valve 240 is provided with a series of angularly spaced radially extending openings, that are in communication with the passage 253 through the control valve. In other angular positions of the control valve, slots communicate with the spaces 287, 293, and 300 encircling the small diameter portions 260, 261, and 259 respectively of the valve 240. Thus at all times when the passages 284, 283, 286, 290, 291, 292, and 299 are not in communication with the radially extending openings through the valve, they are in communication with one of the spaces such as 287, 293, or 300. These spaces respectively are connected to the exhaust passage 285 through exhaust passage 289, 294, and 301.

The end 302 of the control valve 240 is also of reduced diameter and the space 303 encircling the same communicates with the exhaust pressure passage 285 through a passage 304. Thus all of the spaces encircling the small diameter portions of the valve 240 are connected to the exhaust. The arrangement of the pressure openings and exhaust openings in the valve 240 is best illustrated in Figure 13 of the drawings. It will be noted that five pressure passages 305 are provided in the large diameter portion 257 of the valve 240 which, in various rotative positions of this valve, communicates with the passage 292 so as to permit pressure to enter the passage 299 which controls the position of the valve 73. It will also be noted that four slots 306 are provided in this large diameter portion 257 communicating with the space 303 encircling the small diameter end 302 of the valve 240, which is connected to the exhaust passage 285. Similarly in the large diameter portion 257 of the valve 240, three angularly spaced radially extending passages 307 are provided which may communicate with the passage 292 at the left hand end of the cylinder 269. Likewise six slots 309 are provided in the large diameter portion 257 which communicates with the space 293 encircling the small diameter portion 261 of the valve 240. As a result in three rotative positions of the valve 307, pressure will be communicated to the left hand end of the cylinder 269, while in all other rotatative positions of the valve the passage 292 will be in communication with the exhaust.

The large portion 256 of the valve 240 is provided with two angularly spaced radially extending passages 310 which register with the passage 292 in two different rotative positions of the valve 240. In seven other rotative positions of the valve, slots 311 are provided which communicate with the space 293 encircling the small diameter portion 261 of the valve. Therefore, when the valve 240 is in two different rotative positions, pressure will be communicated to the left hand end of the cylinder 269, whereas in all other rotative positions thereof, the passage 292 is communicated with the exhaust.

The large diameter portion 256 of the valve 240 is likewise provided with three spaced radially extending passages 312 communicating with the pressure passage 253 extending axially of the valve so that in three rotative positions of the valve, these passages 312 may communicate with the passage 290 at the left hand end of the cylinder 268. Six slots 313 are likewise provided in the enlarged portion 256 so that when the valve is at any other rotative position the passage 290 will communicate with the exhaust through the space 287.

The enlarged portion 255 of the valve 240 is provided with a pair of radially extending openings 314 which in different rotative positions of the valve register with the passage 286. In all other rotative positions of the valve, slots 315 in the enlarged portion 255 connect the passage 286 to the space 287 which in turn is connected to the exhaust passage 285.

The enlarged portion 255 of the valve 240 is also provided with three radially extending passages 316 therethrough which connect the pressure passage through the valve to the passage 283 leading to the left hand end of the cylinder 263 in three different rotative positions of the valve 240. In all other positions of the valve the passage 283 is connected to the space 300, and therefore to the exhaust passage through angularly spaced slots 317 in the large diameter portion 255.

In summing up the description of the control valve 240 it will be obvious that the passage 299 is either in communication with pressure or with exhaust through the passage 304. The passage 292 is likewise always either in communication with pressure or other exhaust by way of the passage 299. Similarly the passage 291 is either subjected to pressure or to exhaust through the passage 294. The passage 290 is either subjected to pressure or to exhaust through the passage 289. The passage 286 is either subjected to pressure, or else is subjected to exhaust through the passage 289. The passage 283 similarly is either subjected to pressure or to exhaust through the passage 301.

When a reverse speed is desired, it is necessary that the valve 73 remain closed so that the clutch R remains engaged and so that the brake D be engaged. Accordingly in reverse position pressure from the interior of the control valve is communicated only through the passage 314 to the passage 286. Pressure in the passage 286 creates pressure on the right hand side of the piston 276 which forces this piston to the left, as viewed in Figures 1 and 3. Accordingly the piston valve 276 closes the passages 129 of the brake unit D. At the same time the vanes 115 will be forced outwardly by the fluid pressure passing through the passage 319 and the passage 320 and into the opening 143 for creating pressure upon the inner end of the vanes 115. At the same time the pressure leaving from the passageway 319 through 118 forces the plungers 121 to disengage the vane 115. This will create a pressure between the pistons 276 and the vanes 115 and retard the rotor 106 to a standstill.

As noted in Figure 3 of the drawings, the right hand end of the cylinder 266 is connected by a passage 319 and by the passage 320 to the right end of the groove 140 in which the valve 141 is located. This pressure is transmitted through the radially extending opening 321, leading to the area between the cam 109 and the inner surface 139 of the rotor 106, for the purpose of creating a pressure on the inner ends of the vanes 115 and at the same time the pressure from the passage 319 enters the passage 118 to retract the plungers 121, allowing outward movement of the vanes 115 in the rotor 106. As the oil is thus forced to travel through the passageway 129, it is intercepted by the piston 276. This will retard rotation of the rotor 106 as the oil pressure is built up against the outward ends of the vanes 115, thus locking the brake D.

When a neutral speed is desired the control valve 240 may be rotated so that all of the various passages are communicated with the exhaust, and none of the clutches and brakes are engaged with the exception of the normally engaged reversing clutch R. No movement is transmitted from the drive shaft to the driven shaft when the control valve is in this position.

When a first forward speed is desired, the control valve 240 is turned so that pressure is directed through the opening 316 to the passage 283, leading to the left hand end of the cylinder 264. This action tends to force the piston 272 to the right, thereby closing the passages 322 noted in Figures 3 and 12. Before the piston 272 has closed the passages 322, the vanes 85 are released by the points 92 in the aperture 93 of the said vanes. Oil pressure passes through the passageway 96, groove 98, and passage 99 against the plunger 91, compressing the spring 94. The springs 84 will then force the vanes outwardly into the space or pockets 87. Thus the oil flow created by the vanes 85 will be intercepted by the piston 272 which in turn will bring the rotor 83 to a standstill. Accordingly in the manner which has been described the vanes 85 will be stopped from rotation with respect to the casing section 76.

In order to provide a second forward speed, the brake A is released and the brake B is engaged. The clutch R which is normally engaged remains engaged in this speed. The brake B is engaged by oil pressure passing through openings 310 in the valve 240, which leads to the passage 291 at the right end of the cylinder 269. Pressure at the right hand end of the cylinder 269 acts through the passages 323 and 324 to enter the groove 161 in which the valve 162 is located. This pressure passes through the opening 164 to the space between the cam 149 and the rotor 152 to urge the vanes 165 outwardly. Pressure also acts through the passages 118 adjacent the vanes 165 to retract the corresponding plungers 121 and to release the vanes 165 for movement outwardly into engagement with the cam surface 166 of the casing section 79. Simultaneously the piston 280 is forced to the left, closing the passage 167 and therefore stopping rotation of the vanes 165 with respect to the casing section 79. As a result the sun gear 42 is held from rotation, providing a second forward speed as has been previously described.

In the remaining five speeds the clutch R is continuously disengaged. This is accomplished by communicating oil from the passage 353 in the valve 240, through the valve port 305, the passages 299, 297, 296, and 295 to the passage 75 communicating with the valve chamber 72 of the valve 73. This pressure forces the valve 73 to the left, opening a passage 71, whereupon the oil under pressure is forced into the pockets 65 (see Figure 11) forming a part of the clutch R. This pressure forces the blades 69 inwardly, holding the same retracted and thereby permitting free rotation of the rotor 40 with respect to the enclosing casing flange 14.

In order to produce the third speed the clutch R is disengaged as has been pointed out, the brake B remains engaged and clutch E is engaged. In order to accomplish this result hydraulic liquid under pressure issues through the passage 312 in the control valve 240 which is at this time in engagement with the opening 290 extending to the left hand end of the cylinder 266. This pressure holds the piston 276 in the right hand position illustrated in the drawings and at the same time this fluid pressure passes through the openings 129 in a manner to force the blades 115 inwardly. Simultaneously, pressure is transmitted through passages 128 and 118, retracting the cooperable plungers 121 to release the vanes for inward movement. Pressure is also transmitted through the passage 128 to the left end of the valve 162, closing the by-pass passage 164 in the cam 109. As a result the vanes 115 engage the surface of the cam 109, locking the rotor 106 from rotation with respect thereto.

As the cam 109 rotates in unison with the rotor 152 of the brake B, the locking of the brake B therefore acts to lock the cam 109 from rotation. As the rotor 106 is locked with respect to the cam 109, this rotor is also held from rotation. As a result both the sun gears 42 and 53 are held from rotation.

To produce the fourth forward speed, the clutch E remains engaged, and the brake A is likewise engaged. The engagement of the brake A is accomplished in the manner which has been described by rotating the valve 240 until the opening 316 is in registry with the opening 283, forcing hydraulic fluid through the passage 283 in a manner to force the piston 272 to the right end, simultaneously closing the passages 322 in the brake A.

In order to produce a fifth forward speed, the clutch R remains disengaged, while clutches C and E are locked. Clutch C is locked by introducing fluid under pressure through an opening 307 which is in communication with the passage 292 to the left hand end of the cylinder 269. This action holds the piston 280 in its normal right hand position and forces fluid under pressure through the passage 167 to force the vanes 165 inwardly. Pressure is also transmitted through passage 268 to the left end of the valve 162, which moves to close the by-pass passages through the cam 149. Pressure is also transmitted through passages 268 and 118 to retract the cooperable plungers 121 to release the vanes 165 for inward movement. The vanes 165 lock the rotor 152 with respect to the cam 149 so that the rotor and cam rotate in unison. However, as the cam 149 is secured to the driven shaft the rotor 152 is locked for rotation therewith also. The manner in which the clutch E is locked has been described in detail in connection with the explanation of the third forward speed.

In the sixth forward speed the clutch R remains released and clutch C and brake A are engaged in the manner described. For a seventh forward speed clutch R still remains disengaged and clutch C and brake D are engaged in the manner which has been described.

In the operation of the various clutches and brakes, the arrangement is such that the vanes engage the proper cam surface before the by-pass valve closing the by-pass between rotor pockets is closed. For example in brake A, the spring 273 is stronger than the spring urging the plunger 91 into locking position. As a result the plunger 91 disengages the vanes 85 for outward movement before the piston 272 moves to the right as viewed in Figure 3 to close the by-pass passage between the pockets 322. This action retards and cushions the stopping of the rotor 83 relative to its casing 76. A further cushion is provided by the air chamber within the rotor 83.

The brakes B and D operate similarly to the brake A with the exception that hydraulic pressure rather than spring pressure acts to urge the vanes outwardly. Pressure introduced at the right end of cylinder 269 first passes through passages 323 and 118 to disengage the corresponding plunger 121 from the vane to release the vane for outward movement. The pressure also simultaneously passes through the passages 323, 324, valve chamber 161 and passages 164 to exert outward pressure on the vanes 165. Subsequently, spring 281 is contracted and piston 280 moves to the left, closing passages 167. The stopping of the rotor 152 is thus cushioned and is further cushioned by the air chambers 132.

The brake D operates in an identical manner with brake B. The plungers 121 holding vanes 115 from outward movement are first retracted by pressure through passages 319 and 118. Simultaneously, pressure passing through passages 319 and 320, valve chamber 140 and passages 143 urge the vanes outwardly. The pistons 276 then move to the left as viewed in Figure 3, gradually closing by-pass passages 129 and thus cushioning the stopping of the rotor 106. The air chambers 132 within the rotor further cushion this stopping. The clutches C and E also operate similarly. Pressure from the left end of cylinder 269 acts through passages 268 and 118 to retract the plunger 121 to release the vane 165 for inward movement. Simultaneously pressure acts through passages 167 to urge the blades inwardly. Pressure subsequently acts through passage 268 to gradually close the valve 162, to cushion the locking of the rotor 152. The air chamber 146 also assists this action.

Pressure in the left end of cylinder 266 is transmitted through passages 128 and 118 to retract the cooperable plunger 121 holding the vanes 115 from inward movement. Simultaneously pressure through passages 129 acts to urge the vanes inwardly. Subsequently, pressure through passage 128 urges the valve 141 to the right, gradually closing this valve. The stopping of the rotor 106 is further cushioned by the air chamber 146 within the rotor 106.

Figure 10:
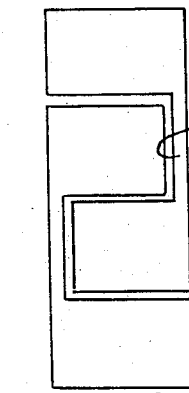
Figure 10 is a diagrammatic view showing a valve cylinder in diagrammatic form.

Figure 10 illustrates diagrammatically the inner surface of each of the cylinders 263, 264, or 269. The surface of each of these cylinders is grooved with grooves 325, shaped substantially as illustrated so as to equalize pressure on opposite sides of the pistons within the cylinders and therefore to prevent these pistons from binding against the wall and being difficult to slide.

*Modified form of transmission*

The transmission illustrated in Figure 14 of the drawings is very similar to that previously described. However, in the gear arrangement illustrated the transmission is provided with ten forward speeds and is designed for use with a reversible motor so that a considerable number of forward speeds may be attained and these speeds will also operate in reverse when the direction of movement of the drive motor is reversed.

The transmission shown in Figure 14 is provided with a drive element not specifically illustrated, which is connected to a crank shaft flange 326 which is bolted to a gear housing 327. A driven shaft 329 is coaxial with the flange 326 and is provided with a herringbone sun gear 330. A sleeve 331 encircles the shaft 329 and is provided with a herringbone sun gear 332. A sleeve 333 encircles a portion of the length of the sleeve 331 and is equipped with a herringbone sun gear 334. An additional sleeve 335 encircles a portion of the sleeve 333 and is provided with a herringbone sun gear 336.

The transmission gear casing 327 includes an outwardly extending flange 337 which is supported by a needle bearing 339 encircling the reduced diameter end 340 of the driven shaft 329. A substantially hollow cylindrical flange 341 projects from the disk-shaped flange 337 near the outer periphery thereof to provide a housing for the clutch R'. A cooperable portion of the casing is provided with a hub 342 encircling the sleeve 335. A disk-shaped housing end 343 extends outwardly from the hub 342 and a sleeve 344 extends to one side of the housing end 343. A ring-shaped flange 345 extends into engagement with the cylindrical flange 341 and is bolted thereto by cap screws 346 or other suitable means. The clutch R' is provided with a rotor 347 supported by a flange 348 which in turn is held properly related to the housing flange 337 by a bearing 349. A disk 350 is supported in parallel relation to the flange 346 and this disk 350 is bolted or otherwise rigidly secured to the flange 346. A stub shaft 351 is supported at opposite ends in the flange 346, and the disk 350 and a double pinion 352 are supported on the shaft 351 by a roller bearing 353.

In actual practice the transmission is provided with a series of angularly spaced shafts 351 and a corresponding number of double pinions 352. However, for the sake of illustration the single double pinion is believed sufficient to illustrate the operativeness of the device.

The double pinion 352 is provided with a relatively small diameter herringbone pinion 354 which engages the sun gear 330 and a second herringbone pinion 355 which engages the sun gear 332. The pinion 355 also engages the internal gear 356 mounted on the sleeve 357. Because of the herringbone construction of the ring gear 356 the sleeve 357 is formed in three parts bolted together so that the helical gears forming the herringbone ring gear can be conveniently cut.

The disk 359 is supported in spaced relation from the housing end 343 and is rotatably supported by a bearing 360. The disk 359 is bolted or otherwise affixed to the casing end 343 so as to rotate as a unit therewith. A stub shaft 361 is supported at opposite ends by the housing end 343 and the disk 359 and a needle bearing 362 encircling the stub shaft 361 supports the double pinion 363. The double pinion 363 is provided with a relatively small diameter herringbone pinion 364. This pinion 364 engages a sun gear 334 on the sleeve 333 and also the ring gear 365 on the ring gear sleeve 357. The double pinion 363 is also provided with a pinion 366 which engages the sun gear 336 on the sleeve 335.

The transmission is enclosed within an enclosing housing 367 which is bolted to the crank case of the engine or drive unit by means of cap screws 369 or the like. The casing is provided with a partition wall 370 which extends inwardly from the outer wall thereof. A bearing 371 is provided between the partition wall 370 and the hub 342 of the transmission housing 327.

Six clutch and brake elements are provided for stopping rotation of the various sleeves 331, 333 and 335, and for preventing relative rotation therebetween. These clutches and brakes are substantially identical in construction with those illustrated in Figure 2 of the drawings. The unit shown in Figure 14 is substantially identical with that illustrated in Figure 3, with the exception that the brake and clutch A'F' is a selectively acting brake and clutch unit, whereas in Figure 3 the brake A is merely a brake. With this exception the units B', C', D' and E' correspond exactly to the units B, C, D, and E in the previously described construction.

The clutch and brake housing includes three sections 372, 373 and 374. The section 372 fits closely adjacent the partition wall 370. The section 373 fits adjacent the section 372 and is provided with a partition wall 368 which is supported at its inner extremity by a bearing 375. The bearing 375 is similar to the bearing 376 which is provided at the inner end of the partition wall 370. The casing section 374 is provided with an inwardly extending supporting flange 377 which supports a bearing 379 at its inner extremity. An end closure wall 380 closes the end of the transmission housing.

The brake and clutch unit A'F' is provided with a hub 381 which is splined to the sleeve 333 and which supports a cam 382, substantially identical in form with the cam 109 illustrated in Figure 2 of the drawings. A rotor 383 is provided with a hub 384 which is splined to the sleeve 335 to rotate therewith. Vanes 386 are supported in the rotor 383 and these vanes are movable either against the cam 382 or outwardly against the internal surface 387 of the casing section 372. The vanes 386 operate in a manner similar to that of the vanes 115 illustrated in Figure 2.

The combined brake and clutch unit D'E' is identical with the unit A'F'. A cam 389 is provided with a hub 390 which is splined to the sleeve 331. A rotor 391 is provided with a hub 392 which is keyed to the sleeve 333. The vanes 393 supported by the rotor 391 are engageable either with the cam 389 or with the internal surface 394 of the casing section 373. Thus the rotor 391 may be locked either with respect to the cam 389 or with respect to the casing section 373.

The brake and clutch unit B'C' is identical with the various units A'F' and D'E' previously described. This unit is provided with an internal cam 395 which is secured to a hub 396 which is keyed to the driven shaft 329. A bearing 397 is provided between the hub 396 and the housing end wall 380.

A rotor 399 is connected to a hub 400 spline connected to the sleeve 331. The rotor 399 carries vanes 401 which are engageable either with the cam 395 or with the internal surface 402 of the housing section 374. In other words, the vanes 401 may lock against the housing section to hold the rotor 399 from rotation, or engage the cam 395 so as to lock the rotor rotatable with the driven shaft.

A control valve 403 is rotatably mounted in the housing sections at either side of the housing. This control valve selectively introduces oil under pressure to any of the clutches and brakes in order to actaute the same. For example the clutch R is normally engaged, the vanes 404 thereof being urged outwardly into engagement with the inner flange surface 405 by means of a spring 406. However, when hydraulic fluid under pressure is introduced through the passage 407 which communicates with the passage 409 in the flange 326, this fluid may force the ring-shaped valve 410 to the left in its ring-shaped groove 411, thus closing the passages 412 between spaced pockets of the rotor surface 405. This action locks the vanes 404 and the rotor supporting the same from rotation with respect to the flange 341. Simultaneously a passage 413 is opened which acts to retract plungers similar to the plungers 121 illustrated in Figure 2 of the drawings. This permits the normally locked vanes 404 to move outwardly under the urge of the spring 406 and to cause the normal locking of the clutch R'.

Figure 17:
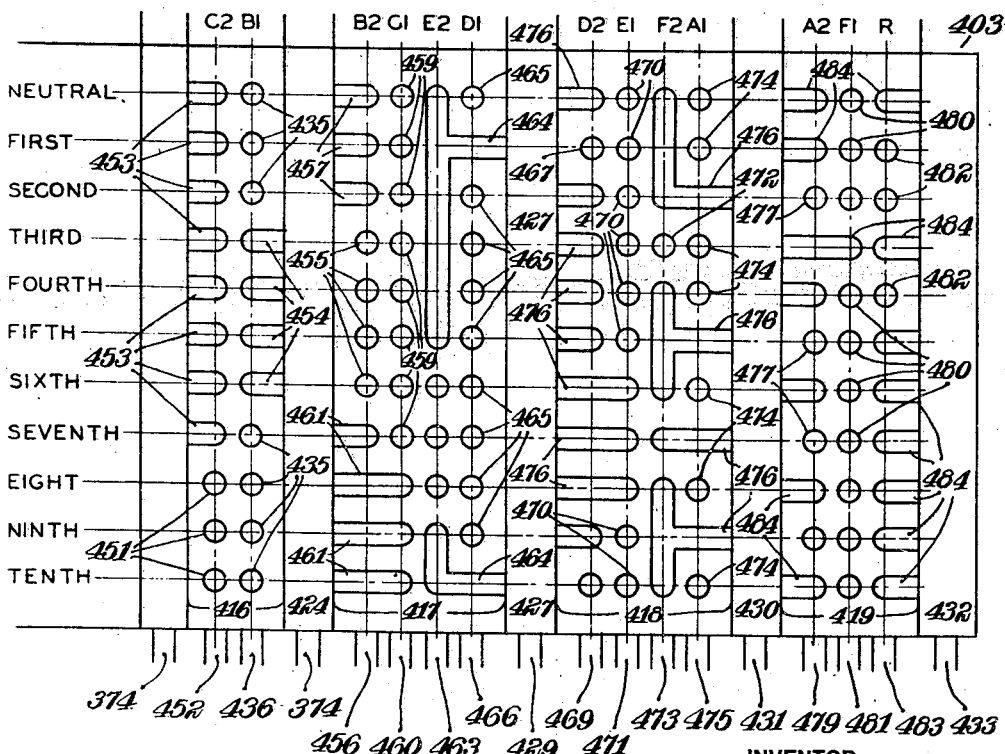
Figure 17 is a diagrammatic view of the control valve used with the construction of Figure 14.

The control valve 403 is operated by any suitable mechanism such as that previously described in connection with the main form of construction. The arrangement of passages through this control valve is best illustrated in Figure 17 of the drawings. The control valve 403 is provided with large diameter portions 416, 417, 418, and 419 which are in spaced relationship and which are connected by smaller diameter portions 420, 421, and 422. A small diameter portion 423 is also provided at the end of the control valve 403. As the control valve cylinder is of uniform diameter throughout its length, a space is provided encircling each small diameter portion. The space 424 encircles the small diameter portion 420 which is connected to the exhaust pressure line 425 by means of a passage 426. The space 427 encircling the small diameter portion 421 is connected to the exhaust passage by means of a passage 429. The space 430 encircles the small diameter portion 422 and is connected to the exhaust passage 425 by the passageway 431. The chamber 432 encircling the small diameter portion 423 is connected to the exhaust passage by a passageway 433.

A passageway 434 extends through the valve 403 longitudinally thereof, fed with oil under pressure. The large diameter portion 416 is provided with a series of apertures 435 through which oil under pressure can be admitted through the passage 436 to the valve chamber 437 of the piston valve 439. The piston valve 439 is urged in one extreme position by the spring 440.

Figure 16:
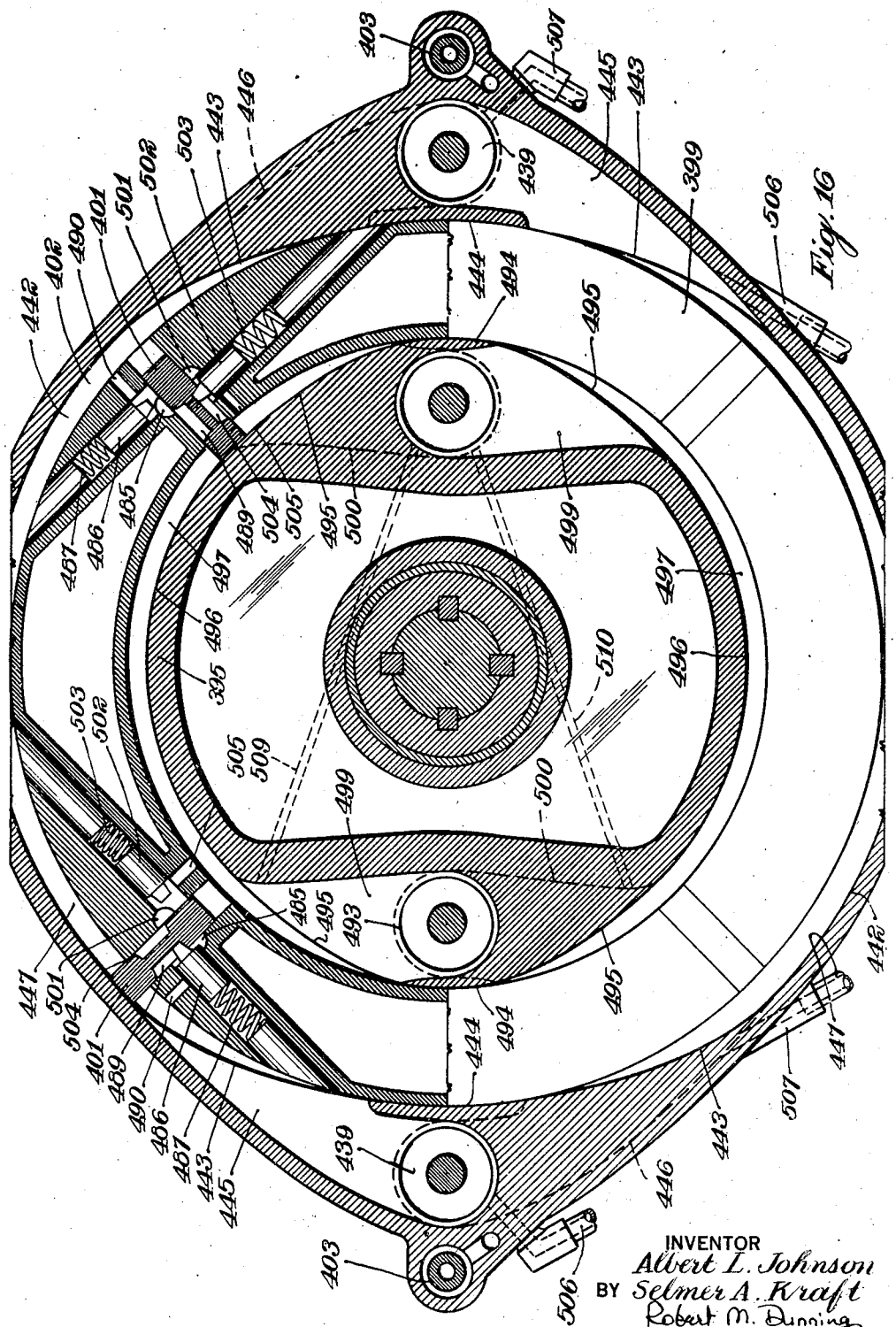
Figure 16 is a cross-sectional view through a clutch unit of the transmission illustrated in Figure 14.

The brake and clutch unit B' C' is shown in detail in Figure 16 of the drawings. In this figure it will be noted that the blades are in a different rotative position from that in which they are shown in Figure 14.

The brake B is shown as having an outer casing 374 which is provided with a cam-shaped inner surface 402. This cam-shaped inner surface includes two opposed arcuate segments 442 of larger diameter than the rotor 399 which are connected by inclined cam portions 443 to small diameter portion 444 adjacent the valves 403. Axially spaced passages 445 and 446 provide a communication between the pockets 447 formed between the rotor 399 and the casing 374 on diametrically opposite sides of the rotor. When the passage 445 is in communication with the passage 446 fluid may flow from one pocket to the other and as a result the rotor 399 may rotate with respect to the casing 374. However, the communication between the passages 445 and 446 may be broken by means of the valve 439. Thus when the valve 439 is in the position shown in Figure 14 of the drawings, the passages 445 and 446 communicate between the ends 449 and 450 of the valve 439. However, when the valve 439 is moved to the left compressing the spring 440 the passage 446 is cut off from the passage 445 so that no fluid can pass from one pocket 447 to the other. In such an instance the rotor 399 is stopped from rotation with respect to its casing.

The control valve 403 is formed as best illustrated in Figure 17 of the drawings. A number of apertures are provided through the large diameter portions of the valve, each of which communicate with the pressure passage 434 extending through the valve axially. A series of slots are also provided in the valve which are connected to the ends of the large diameter portions and are thereby connected to the exhaust passage 425 in the manner which has been described. The large diameter portion of the valve 416 is provided with a series of openings 451 which are designed to register with the passage 452 in certain angular positions of the valve. Slots 453 communicate with exhaust pressure and are in communication with the passage 452 in all other rotative positions of the valve. A row of apertures 435 is also provided in the large diameter portion 416 and these communicate with the passage 436 in certain predetermined angular positions of the valve. Slots 454 communicating with exhaust pressure through the passage 374 are at all other times in communication with the passage 436.

The large diameter portion 417 is provided with four axially spaced rows of apertures therethrough. A first series of apertures 455 are provided which communicate with the passage 456. Slots such as 457 are in communication with the passage 456 at all other rotative positions. A second row of apertures 459 is provided and those communicate with the passage 460 in predetermined angular positions of the valve. In other rotative positions the passage 460 is connected to the exhaust by slots 461.

A third row of apertures 462 is provided which may register with the passage 463. At all other rotative positions the passage 463 is connected to the exhaust by slots 464. A fourth row of apertures 465 is provided in the valve 403 which may communicate with the passage 466. In all other rotative positions of the valve this passage 466 is connected to the exhaust through the slots 464.

The large diameter portion 418 is provided with a first series of apertures 467 which communicate with the passage 469 and a second row of apertures 470 which may communicate with the passage 471. A third row of apertures 472 communicate with the passage 473 and a fourth row of apertures 474 is designed to register with the passage 475. In all other rotative positions of the valve the passages 469, 471, 473, and 475 are connected to the exhaust by slots such as 476.

The large diameter portion 419 of the valve 403 is provided with a first series of apertures 477 which may register with the passage 479. A second row of apertures 480 may register with the passage 481. The third and last row of apertures 482 may communicate with the passage 483. In all rotative positions of the valve where the pistons 477, 480 and 482 do not engage their respective passages, these passages are connected to the exhaust through the slots such as 484.

As indicated by the identifying letters at the top of Figure 17 of the drawings, certain rows of apertures are simultaneously operated. It will be noted that when the apertures 451 of the row of apertures C2 are in communication with the passage 452, the passage 460 communicable with the apertures 459 of row C1 are in communication with exhaust pressure. Similarly, when the apertures 435 of row B1 are in registry with the passage 436, the passage 456 in row B2 will be subject to exhaust pressure.

Similarly the rows E1 and E2 are similarly arranged so that when the passage 471 communicable with the apertures of row E1 is subject to fluid under pressure the passage 463 will be subjected to exhaust pressure and vice versa. Likewise when the passage 466 of row D1 is subjected to pressure the passage 469 will be connected to exhaust pressure. Rows of apertures A1 and A2 and F1 and F2 operate similarly so that when the passage associated with one row is subjected to pressure the passage associated with the other row is subjected to exhaust pressure.

Let us now consider the operation of brake and clutch unit B'C', as this operates in a manner identical with the operation of the other units with the exception of the clutch R'. Therefore an explanation of the operation of the unit B'C' will suffice to show how the units D'E' and A'F' operate.

When in certain rotative positions the passages 451 are in communication with the passage 452 and simultaneously passage 460 is in communication with exhaust pressure. The passage 452 communicates with a lateral passage 485 adjacent the vanes 401 and when pressure is exerted through the passages 485 the plungers 486 are retracted against tension of the springs 487, thus withdrawing these plungers 486 from the slots 489 in the vanes 401. This pressure acts to release the vanes 401 for inward movement into the position illustrated in the upper right hand vane 401 shown in Figure 16 of the drawings. Upon retraction of the plunger 486, passages 490 are opened, thereby exerting pressure on the outer ends of the vanes 401 and forcing these vanes inwardly against the cam surface 402 of the cam 395.

The passage 452 also leads to the valve chamber 492 of the piston valve 493 which is normally urged by a spring 491 to the left hand end of its chamber as viewed in Figure 14. The pressure acting through the passage 452 therefore urges the valve 493 into the position illustrated in Figure 14 of the drawings. Simultaneously, the passage 460 is subjected to exhaust pressure and therefore the movement of the valve 493 to the right is not impeded. As the spring 491 is of greater tension than the spring 487, urging the plunger 486 in vane engaging position, it is obvious that the plungers 486 will be retracted prior to the movement of the valve 493 into closed position.

As illustrated in Figure 16 of the drawings, the cam 395 is substantially similar to cam 109 illustrated in Figure 2 of the drawings. This cam 395 is provided with two peak portions 494 of greatest diameter which are connected by inclined cam portions 495 to a pair of intermediate arcuate portions 496 which are in opposed relation. The cam thus forms pockets 497 between the cam and the rotor 399, these pockets being similar to the pockets 125 shown in Figure 2 of the drawings. The pockets 497 are connected by axially spaced by-passed passages 499 and 500 which communicate between the large diameter ends of the valve 493. However, when the spring 491 is compressed as shown in Figure 14, one end of the valve 493 closes off the passage 499 from the passage 500, thereby closing the by-pass between the pockets and preventing the flow of fluid from one pocket to the other. As a result when the valve 493 is in the position shown in Figure 1 of the drawings, the rotor 399 will be locked from rotation with respect to the cam 395.

In other rotative positions of the valve 403 the passages 460 are subjected to fluid pressure, while the passages 452 are subjected to exhaust pressure. When this action takes place the pressure through the passage 460 will tend to urge the valve 493 to the right, thus opening the by-pass passage between the passages 499, 500, between the pockets 497 of the cam 395. As the passage 452 is simultaneously subjected to exhaust pressure this return movement of the valve 492 will not be impeded.

In certain rotative positions of the valve 403 the passage 436 is subjected to fluid under pressure and the passage 456 is simultaneously subjected to exhaust pressure. Pressure through the passage 436 tends to urge the piston valve 439 to the right into the position shown in Figure 14, supplementing the action of the spring 440. As exhaust pressure is present on the opposite side of the valve, this valve movement will not be impeded.

When the passage 456 is subjected to fluid under pressure fluid may flow through the transverse passage 501 adjacent the vane 401. This fluid pressure acts to retract the plungers 502 against the reaction of the springs 503, withdrawing the plungers 502 from the slots 504 and permitting the vanes 401 to move outwardly into the position shown in the upper left hand portion of Figure 16 of the drawings. Upon retraction of the plungers 502, the passages 505 are opened, permitting fluid under pressure to enter the pockets 497 to force the vanes 401 outwardly against the inner cam surface 402 of the rotor casing. Subsequently, pressure through the passage 456 urges the piston 439 to the left from the position illustrated in Figure 14 of the drawings, gradually compressing the spring 440 and closing the by-pass passages 445, 446 connecting the opposed pockets 447. Thus when the valve 439 is in its closed position the rotor 399 will be locked from rotation with respect to its casing.

In order to balance the operation of our clutch and brake unit, the by-pass passages on opposite sides of the unit may be connected together so that pressure in the two sides may be equalized. For example the by-pass passages 445 on opposite sides of the unit may be connected by a tubular connection 506, only the ends of which are illustrated in Figure 16. Similarly the by-pass passages 446 may be connected by a tubular connection 507, the ends of which are shown in Figure 16.

Similar passages 509 and 510 connect the by-pass passages 499 on opposite sides of the unit and connect the by-pass passages 500 on opposite sides of the unit.

The brake and clutch units D'E' and A'F' operate in a manner identical with that described in connection with unit B'C'. The vanes of the various clutches and brakes may be caused by hydraulic pressure to engage either the inner cam surface or the outer cam wall. As illustrated in Figures 15 and 16 of the drawings the vanes of the various clutch and brake units are normally locked in intermediate position in which they are entirely withdrawn into the confines of the rotor and are held in this position by plungers until released for inward or outward movement by hydraulic pressure. It is also obvious that the same pressure which releases the plungers may also act to urge the vanes either inwardly or outwardly through the passages 490 and 505.

The clutch R' is actuated by communication of the apertures 482 with the passage 483. The passage 483 leads through the casing 367 and through the casing end plate 511 communicating with the passage 409 leading to the chamber 411 of the valve 410. When pressure is exerted through the passage 483 and the passage 409 the locking means holding the vanes 404 retracted are released, allowing these vanes to move outwardly into engagement with the cam surface 405 of the clutch. Further pressure acts to urge the valve 410 to the left as viewed in Figure 14, closing the by-pass passage 412 between opposed pockets in the rotor surface 405. The clutch R' is in this manner engaged.

The following table describes which clutches and brakes are locked in order to provide any of the speeds of which the clutch or brake is capable. The first speed which is mentioned in this list is preferably a neutral speed at which the driven shaft will not revolve with respect to the drive shaft. The gears are so proportioned that when the transmission is in the first speed mentioned the driven shaft will be held stationary. Any tendency for the driven shaft to revolve with respect to the drive shaft would thus be prevented by the transmission. The various clutches and brakes which are engaged to provide the various speeds are described in the following table.

| Speed | A' | B' | C' | D' | E' | F' | R' |
|---|---|---|---|---|---|---|---|
| Neutral | | | | | | | |
| First | | | | X | | | X |
| Second | X | | | | | | X |
| Third | | X | | | | X | |
| Fourth | | X | | | | | X |
| Fifth | X | X | | | | | |
| Sixth | | X | | | X | | |
| Seventh | X | | | | X | | |
| Eighth | | | X | | X | | |
| Ninth | X | | X | | | | |
| Tenth | | | X | X | | | |

In accordance with the patent statutes, we have described the principles of construction and operation of our hydraulic transmission control, and while we have endeavored to set forth the best embodiments thereof, we desire to have it understood that obvious changes may be made within the scope of the following claims without departing from the spirit of our invention.

Claims to the specific brake and clutch structure are not claimed herein but form the subject matter of a divisional application Serial No. 573,475 filed January 19, 1945. Claims to the control mechanism are presented in a continuing application Serial No. 573,476 filed January 19, 1945, and claims of the present application are directed to the transmission mechanism.

We claim:

1. In a transmission, a rotatable drive means, a driven shaft, a pair of epicyclic gear systems connecting said shafts comprising three relatively rotatable sun gears coaxial with, and rotatable with respect to, said driven shaft, a pair of rotatable planet gear carriers, planet gear means on one of said carriers engaging one of said sun gears, second planet gears on the other of said carriers engaging a second of said sun gears, ring gears of relatively different diameters connected together and engaging said first and second planet gear means, pinion means rotatable with said first named planet gears engaging the third of said sun gears, means connecting said second planet gears to said driven shaft to rotate said driven shaft, a releasable hydraulic clutch of the vane type serving when engaged to lock said planet gear carriers against relative rotation in either direction, and means for holding one sun gear stationary.

2. In a transmission, a rotary drive means, and a rotary driven element, a pair of epicyclic gear systems connecting said drive means and said driven element comprising a first sun gear, a second sun gear connected to said driven element, a first gear carrier connected to said drive means to rotate therewith, a second relatively rotatable gear carrier, a first pinion means on said first gear carrier engaging said first sun gear, a second pinion means on said second gear carrier engaging said second sun gear, first and second ring gears connected for rotation in unison and engaging said first and second pinion means, respectively, a cam-shaped chamber carried by said drive means, and a rotor having outwardly projectable vanes secured to said second gear carrier, said vanes being operable in projected position to lock said rotor from rotation relative to said chamber.

3. In combination with an epicyclic transmission including a series of relatively rotatable elements wherein the speed ratio of the relatively rotatable elements may be controlled by holding selected relatively rotatable elements stationary or locked for rotation in unison with another relatively rotatable element, a series of clutch and brake units secured to said relatively rotatable elements to hold the same from relative rotation or to hold the same stationary, said clutch and brake units comprising vane pumps capable of circulating hydraulic fluid, and control means regulating the circulation from said pumps to hold selected pumps from relative rotation.

4. The combination of a planetary transmission having two components which are capable of independent rotation on a common axis and means operable selectively to clutch said components together, or arrest rotation of one while leaving the other free to rotate, or free both to rotate, comprising liquid filled housings forming two vane type pump chambers and an annular vane guiding rotor separating said chambers, coaxial with said rotary components and connected with the first thereof, one chamber-forming housing being fixed and the other connected with the second rotatable component; vanes guided by and shiftable through said rotor between an inactive setting in which the vanes are housed in the rotor, and two active settings in which respectively the vanes project inward and outward from the rotor into respective chambers; and means resisting displacement of liquid from the pump chambers by said vanes.

5. The combination of a planetary transmission having two components which are capable of independent rotation on a common axis and means operable selectively to clutch said components together, or arrest rotation of one while leaving the other free to rotate, or free both to rotate, comprising liquid filled housings forming two vane type pump chambers, and an annular vane guiding rotor separating said chambers, coaxial with said rotary components and connected with the first thereof, one chamber-forming housing being fixed and the other connected with the second rotatable component; vanes guided by and shiftable through said rotor between an inactive setting in which the vanes are housed in the rotor, and two active settings in which respectively the vanes project inward and outward from the rotor into respective chambers; distinct means for latching said vanes against inward and against outward motion from said inactive position; and selectively operable hydraulic means for releasing respective latches and for biasing said vanes to shift in the permitted direction; and means resisting displacement of liquid from the pump chambers by said vanes.

6. The combination of the structure defined in claim 5, and gas retaining cushioning chambers in said rotor and serving to soften the impact as the vanes become effective to displace liquid.

7. The combination defined in claim 5 in which the planetary transmission is of the compound type involving two planetary trains, each including a sun gear, said sun gears being the components capable of independent rotation.

ALBERT L. JOHNSON.
SELMER A. KRAFT.

REFERENCES CITED

The following references are of record in the file of this patent:

UNITED STATES PATENTS

| Number | Name | Date |
|---|---|---|
| 1,418,537 | Cotal | June 6, 1922 |
| 1,652,432 | Fisher | Dec. 13, 1927 |
| 1,803,235 | Cotal | Apr. 28, 1931 |
| 2,069,408 | Forichon | Feb. 2, 1937 |
| 2,038,613 | Staats | Apr. 28, 1936 |
| 2,191,320 | Kessler | Feb. 20, 1940 |
| 2,204,589 | Haller | June 18, 1940 |
| 2,304,131 | Vickers | Dec. 8, 1942 |
| 1,134,770 | Sundh | Apr. 6, 1915 |
| 2,001,325 | Ives | May 14, 1935 |
| 2,190,122 | Mohler | Feb. 13, 1940 |
| 2,348,980 | Johnson | May 16, 1944 |
| 2,135,908 | Millican | Nov. 8, 1938 |

FOREIGN PATENTS

| Number | Country | Date |
|---|---|---|
| 337,242 | British | Oct. 30, 1930 |
| 553,497 | French | Feb. 12, 1923 |